(12) United States Patent
Zhang et al.

(10) Patent No.: US 11,330,564 B2
(45) Date of Patent: May 10, 2022

(54) METHOD AND DEVICE IN UE AND BASE STATION USED FOR WIRELESS COMMUNICATION

(71) Applicants: XiaoBo Zhang, Shanghai (CN); Lin Yang, Shanghai (CN)

(72) Inventors: XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 232 days.

(21) Appl. No.: 16/831,857

(22) Filed: Mar. 27, 2020

(65) Prior Publication Data

US 2020/0229151 A1  Jul. 16, 2020

Related U.S. Application Data

(63) Continuation of application No. PCT/CN2019/095954, filed on Jul. 15, 2019.

(30) Foreign Application Priority Data

Jul. 30, 2018  (CN) .......................... 201810853930.X

(51) Int. Cl.
*H04W 72/04*  (2009.01)

(52) U.S. Cl.
CPC ....... *H04W 72/04* (2013.01); *H04W 72/0446* (2013.01); *H04W 72/0453* (2013.01); *H04W 72/0493* (2013.01)

(58) Field of Classification Search
CPC ......... H04W 72/0446; H04W 72/0453; H04W 72/1257; H04W 72/0493; H04L 5/0094
See application file for complete search history.

(56) References Cited

U.S. PATENT DOCUMENTS 10,595,336 B2 * 3/2020 Ma .......................... H04L 1/1896
10,812,983 B2 * 10/2020 Yeo ............................ H04W 8/24
(Continued)

FOREIGN PATENT DOCUMENTS

| CN | 101998611 A | 3/2011 |
| CN | 106658742 A | 5/2017 |

(Continued)

OTHER PUBLICATIONS

ISR received in application No. PCT/CN2019/095954 dated Sep. 26, 2019.

(Continued)

*Primary Examiner* — Raj Jain

(57) ABSTRACT

The present disclosure discloses a method and a device in a User Equipment (UE) and a base station for wireless communication. The UE receives a first signaling, the first signaling being used to determine a first time-frequency resource; receives a second signaling, the second signaling being used to determine a second time-frequency resource; and transmits a first bit block in the first time-frequency resource, or, transmits a first bit block in the second time-frequency resource. Time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

20 Claims, 23 Drawing Sheets

(56) References Cited

U.S. PATENT DOCUMENTS

| | | | |
|---|---|---|---|
| 2017/0099658 A1* | 4/2017 | Shattil | H04L 63/061 |
| 2018/0110041 A1 | 4/2018 | Bendlin et al. | |
| 2019/0028229 A1* | 1/2019 | Yeo | H04L 1/0058 |
| 2019/0335423 A1* | 10/2019 | Wu | H04W 72/0453 |
| 2019/0342059 A1* | 11/2019 | Zhang | H04L 5/0082 |
| 2019/0394757 A1* | 12/2019 | Zhang | H04W 72/04 |
| 2020/0229148 A1* | 7/2020 | Jiang | H04W 24/08 |
| 2020/0229151 A1* | 7/2020 | Zhang | H04W 72/04 |
| 2020/0288484 A1* | 9/2020 | Jiang | H04L 1/1822 |

FOREIGN PATENT DOCUMENTS

| | | | |
|---|---|---|---|
| CN | 107483166 A | 12/2017 | |
| CN | 108282876 A | 7/2018 | |
| WO | 2017184850 A | 10/2017 | |
| WO | 2017218785 A | 12/2017 | |

OTHER PUBLICATIONS

Huawei et al, "UL Multiplexing for URLLC", 3GPP TSG RAN WG1 Meeting #93 R1-1806893, May 25, 2018.
Zte et al, "UCI multiplexing for URLLC", 3GPP TSG RAN WG1 Meeting #92bis R1-1804173, Apr. 20, 2018.
CN 1st Office Action received in application No. 201810853930.X dated May 25, 2020.
CN 1st Search Report received in application No. 201810853930.X dated May 18, 2020.
3GPP Huawei, Hisilicon RP_180889 Views on NR URLLC work in Rel-16.

* cited by examiner

METHOD AND DEVICE IN UE AND BASE STATION USED FOR WIRELESS COMMUNICATION

CROSS-REFERENCE TO RELATED APPLICATION

This application is a continuation of International Application No. PCT/CN2019/095954, filed on Jul. 15, 2019, claiming the priority benefit of Chinese Application No. 201810853930.X, filed on Jul. 30, 2018, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In 5G system, Enhance Mobile Broadband (eMBB) and Ultra Reliable and Low Latency Communication (URLLC) are two typical business types. In 3rd Generation Partner Project (3GPP) New Radio (NR) Release 15, a new Modulation and Coding Scheme (MCS) table targeting lower target Block Error Rate (BLER) required for URLLC business was defined.

With a purpose of supporting more demanding URLLC business, for example, with higher reliability (e.g., a target BLER is $10^{-6}$) or with lower delay (e.g., 0.5-1 ms), a Study Item (SI) on URLLC advancement in NR Release 16 was approved at the 3GPP Radio Access Network (RAN) #80$^{th}$ Plenary Session. In the SI, the advancement in Hybrid Automatic Repeat reQuest (HARQ) feedback/Channel State Information (CSI) feedback has been a focus of the study.

SUMMARY

The inventors have found through researches that Uplink Control Information (UCI) includes HARQ/CSI. When a PUCCH reserved for transmission of UCI and a PUSCH are not orthogonal in time domain, in order to support more reliable transmission in NR Release 16, how to transmit UCI becomes a significant problem needed to be reconsidered.

In view of the above problem, the present disclosure provides a solution. It should be noted that the embodiments of the present disclosure and the characteristics in the embodiments can be arbitrarily combined if there is no conflict.

The present disclosure discloses a method in a User Equipment (UE) for wireless communication, comprising:
  receiving a first signaling, the first signaling being used for determining a first time-frequency resource;
  receiving a second signaling, the second signaling being used for determining a second time-frequency resource; and
  transmitting a first bit block in the first time-frequency resource, or, transmitting a first bit block in the second time-frequency resource;
  herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, a problem needed to be solved in the present disclosure is how to achieve advancement in UCI transmission in order to meet the requirement for higher reliability in NR Release 16 when a PUCCH and a PUSCH are non-orthogonal in time domain.

In one embodiment, a problem needed to be solved in the present disclosure is: in the existing standards, when a PUCCH reserved for transmitting UCI is not orthogonal with a PUSCH in time domain, UCI will be shifted to be transmitted on the PUSCH. However, in the NR Release 16, a PUCCH reserved for transmitting UCI in URLLC business has higher transmission reliability. If the PUCCH is not orthogonal with a PUSCH (eMBB/URLLC business) in time domain, and methods in the present standards remain to be used, the UCI will be shifted to be transmitted on a PUSCH, and the transmission reliability of the UCI will probably not be guaranteed. Therefore, in order to support the requirement for higher reliability posed by NR Release 16, when a PUCCH and a PUSCH are non-orthogonal in time domain, how to transmit UCI becomes a crucial problem in need of reconsideration.

In one embodiment, the essence of the above method lies in that a first time-frequency resource is a PUCCH, a second time-frequency resource is a PUSCH, a first bit block is UCI, the PUCCH and the PUSCH are non-orthogonal in time domain, a first identifier and a second identifier are both Radio Network Temporary Identifiers (RNTIs) used for scrambling CRC of DCI, wherein the first identifier is for URLLC business, while the second identifier is for eMBB business. An advantage of using the above method is that whether UCI is transmitted on a PUCCH or a PUSCH can be determined based on an RNTI for scrambling the CRC of the DCI.

In one embodiment, the above method is characterized in that if the first signaling carries the first identifier, then the first bit block is transmitted in the first time-frequency resource or the first bit block is transmitted in the second time-frequency resource, if the first signaling carries the second identifier, then the first bit block is only transmitted in the second time-frequency resource between the first time-frequency resource and the second time-frequency resource.

In one embodiment, the essence of the above method lies in that when a PUCCH reserved for transmitting UCI is not orthogonal with a PUSCH in time domain, if the UCI is for eMBB, then the UCI is transmitted using methods in conformity with the present standards, namely, the UCI is transmitted on the PUSCH; or if the UCI is for URLLC, then the UCI may be transmitted either on the PUCCH or the PUSCH.

In one embodiment, the above method is characterized in that the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource.

In one embodiment, the essence of the above method lies in that when a PUCCH reserved for URLLC UCI is not orthogonal with a PUSCH in time domain, whether URLLC UCI is transmitted on the PUCCH or on the PUSCH is related to a relative positional relation between time domain resource comprised in the PUCCH and time domain resource comprised in the PUSCH, or is related to a relative numerical relation between the time domain resource comprised in the PUCCH and the time domain resource comprised in the PUSCH, or is related to whether the PUSCH is for eMBB business or URLLC business.

According to one aspect of the present disclosure, comprising:

receiving first information; and receiving a first radio signal;

herein, the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received.

According to one aspect of the present disclosure, the above method is characterized in comprising:

if the first bit block is transmitted in the second time-frequency resource, then a second radio signal is also transmitted in the second time-frequency resource;

if the first bit block is transmitted in the first time-frequency resource, then a transmission of a second radio signal is dropped in the second time-frequency resource, or a first sub-signal is also transmitted in the second time-frequency resource, and a transmission of a second sub-signal is dropped in the second time-frequency resource;

herein, the second signaling is further used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource.

According to one aspect of the present disclosure, the above method is characterized in that the first bit block is transmitted in the first time-frequency resource, the first time-frequency resource comprises K time-frequency resources, any two time-frequency resources of the K time-frequency resources are mutually orthogonal, K is a positive integer greater than 1; the first bit block comprises a first bit sub-block and a second bit sub-block, the first bit sub-block is used for indicating whether the first radio signal is correctly received; the first bit sub-block is transmitted in each time-frequency resource of the K time-frequency resources; the second bit sub-block is transmitted in each time-frequency resource of the K time-frequency resources or at least one bit in the second bit sub-block is transmitted in only one time-frequency resource of the K time-frequency resources.

In one embodiment, the essence of the above method lies in that transmitting the same URLLC UCI repeatedly on multiple PUCCHs within a slot is a research orientation of NR Release 16, K time-frequency resources are K PUCCHs used for transmitting the same URLLC UCI within a slot; a first bit sub-block is demanding URLLC UCI, which needs to be transmitted multiple times, while a second bit sub-block is eMBB UCI or less demanding URLLC UCI, which needs to be transmitted only once; the demanding URLLC UCI is transmitted in each time-frequency resource of K time-frequency resources; each bit in eMBB UCI or less demanding URLLC UCI is transmitted in each time-frequency resource of K time-frequency resources or is only transmitted in one or multiple time-frequency resources of the K time-frequency resources. An advantage of the above method is that if each bit in eMBB UCI or less demanding URLLC UCI is transmitted in each time-frequency resource of K time-frequency resources, then eMBB UCI or less demanding URLLC UCI will be repeatedly transmitted so as to enhance transmission reliability; if each bit in eMBB UCI or less demanding URLLC UCI is only transmitted in one or multiple time-frequency resources of the K time-frequency resources, a smaller PUCCH resource can be chosen to transmit UCI, thereby improving resource utilization, and increasing the system transmission capacity.

According to one aspect of the present disclosure, the above method is characterized in comprising:

receiving second information; and receiving a third radio signal;

herein, the second information is used for determining configuration information of the third radio signal; the first bit block comprises the first bit sub-block and the second bit sub-block, the second bit sub-block is acquired based on a measurement(s) on the third radio signal.

According to one aspect of the present disclosure, the above method is characterized in comprising:

receiving third information;

herein, the third information is used for indicating N time-frequency resource sets, the first time-frequency resource is related to a first time-frequency resource set, the first time-frequency resource set is one of the N time-frequency resource sets; a number of bits comprised in the first bit block is used for determining the first time-frequency resource set out of the N time-frequency resource sets. N is a positive integer greater than 1.

The present disclosure discloses a method in a base station for wireless communication, comprising:

transmitting a first signaling, the first signaling being used for determining a first time-frequency resource;

transmitting a second signaling, the second signaling being used for determining a second time-frequency resource; and receiving a first bit block in the first time-frequency resource, or, receiving a first bit block in the second time-frequency resource;

herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

According to one aspect of the present disclosure, the above method is characterized in that if the first signaling carries the first identifier, the first bit block is received in the first time-frequency resource, or the first bit block is received in the second time-frequency resource; if the first signaling carries the second identifier, the first bit block is only received in the second time-frequency resource between the first time-frequency resource and the second time-frequency resource.

According to one aspect of the present disclosure, the above method is characterized in that the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource.

According to one aspect of the present disclosure, the above method is characterized in comprising:
transmitting first information; and
transmitting a first radio signal;
herein, the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received.

According to one aspect of the present disclosure, the above method is characterized in comprising:
if the first bit block is transmitted in the second time-frequency resource, then a second radio signal is also received in the second time-frequency resource;
if the first bit block is transmitted in the second time-frequency resource, then a reception of a second radio signal is dropped in the second time-frequency resource, or
a first sub-signal is also received in the second time-frequency resource, and a reception of a second sub-signal is dropped in the second time-frequency resource;
herein, the second signaling is further used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource.

According to one aspect of the present disclosure, the above method is characterized in that the first bit block is transmitted in the first time-frequency resource, the first time-frequency resource comprises K time-frequency resources, any two time-frequency resources of the K time-frequency resources are mutually orthogonal, K is a positive integer greater than 1; the first bit block comprises a first bit sub-block and a second bit sub-block; the first bit sub-block is used for indicating whether the first radio signal is correctly received; the first bit sub-block is transmitted in each time-frequency resource of the K time-frequency resources; the second bit sub-block is transmitted in each time-frequency resource of the K time-frequency resources, or, at least one bit in the second bit sub-block is transmitted in only one time-frequency resource of the K time-frequency resources.

According to one aspect of the present disclosure, the above method is characterized in comprising:
transmitting second information; and
transmitting a third radio signal;
herein, the second information is used for determining configuration information of the third radio signal; the first bit block comprises the first bit sub-block and the second bit sub-block, the second bit sub-block is acquired based on a measurement(s) on the third radio signal.

According to one aspect of the present disclosure, the above method is characterized in comprising:
transmitting third information;
herein, the third information is used for indicating N time-frequency resource sets, the first time-frequency resource is related to a first time-frequency resource set, the first time-frequency resource set is one of the N time-frequency resource sets; a number of bits comprised in the first bit block is used for determining the first time-frequency resource set out of the N time-frequency resource sets. N is a positive integer greater than 1.

The present disclosure discloses a UE for wireless communication, comprising:
a first receiver, receiving a first signaling, the first signaling being used for determining a first time-frequency resource; receiving a second signaling, the second signaling being used for determining a second time-frequency resource; and
a first transmitter, transmitting a first bit block in the first time-frequency resource, or transmitting a first bit block in the second time-frequency resource;
herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

The present disclosure discloses a base station for wireless communication, comprising:
a second transmitter, transmitting a first signaling, the first signaling being used for determining a first time-frequency resource; and transmitting a second signaling, the second signaling being used for determining a second time-frequency resource; and
a second receiver, receiving a first bit block in the first time-frequency resource, or receiving a first bit block in the second time-frequency resource;
herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, the present disclosure has the following advantages compared with conventional schemes:
In existing standards, when a PUCCH reserved for transmitting UCI is not orthogonal with a PUSCH in time domain, the UCI is shifted to be transmitted on the PUSCH. In NR Release 16, a PUCCH reserved for transmitting UCI in URLLC business has higher transmission reliability. If the PUCCH is not orthogonal with a PUSCH (eMBB/URLLC business) in time domain, and methods in the present standards remains to be used, the UCI will be shifted to be transmitted on a PUSCH, as a result, the transmission reliability of the UCI will probably not be guaranteed. The present disclosure can help solve this problem.

Whether UCI is for URLLC business or for eMBB business can be determined on the basis of RNTI for scrambling the CRC of DCI; when a PUCCH reserved for transmitting UCI is not orthogonal with a PUSCH in time domain, if the UCI is for eMBB, then the UCI is transmitted using the methods in the present standards, namely, the UCI is transmitted on the PUSCH; or if the UCI is for URLLC, then whether URLLC UCI is transmitted on the PUCCH or on the PUSCH is related to a relative positional relation between time domain resource comprised in the PUCCH and time domain resource comprised in the PUSCH, or is related to a relative numerical relation between the time domain resource comprised in the PUCCH and the time domain resource comprised in the PUSCH, or is related to whether the PUSCH is for eMBB business or URLLC business.

To achieve higher transmission reliability and lower latency, transmitting the same URLLC UCI repeatedly on multiple PUCCHs within a slot is a research orientation of NR Release 16. If UCI needed to be transmitted within a slot includes demanding URLLC UCI, which needs to be transmitted multiple times, and eMBB UCI/less demanding URLLC UCI, which needs to be transmitted only once; the demanding URLLC UCI is transmitted on each PUCCH of the multiple PUCCHs; each bit in eMBB UCI or less demanding URLLC UCI is transmitted on each PUCCH of the multiple PUCCHs, or is only transmitted on one or multiple PUCCHs of the multiple PUCCHs. An advantage of the above method is that if each bit in eMBB UCI or less demanding URLLC UCI is transmitted on each PUCCH of the multiple PUCCHs, then the eMBB UCI or less demanding URLLC UCI will be repeatedly transmitted so as to enhance transmission reliability; if each bit in eMBB UCI or less demanding URLLC UCI is only transmitted in one or multiple PUCCHs of the multiple PUCCHs, a smaller PUCCH resource can be chosen to transmit the UCI, thereby improving resource utilization, and increasing the system transmission capacity.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
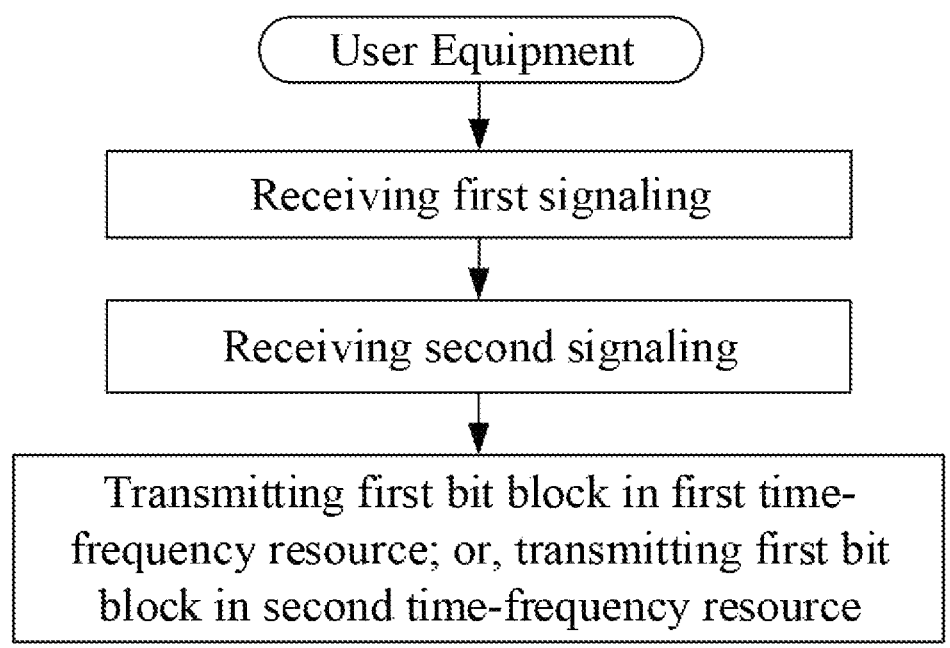
FIG. 1 illustrates a flowchart of a first signaling, a second signaling and a first bit block according to one embodiment of the present disclosure.

Embodiment 1 illustrates a flowchart of a first signaling, a second signaling and a first bit block, as shown in FIG. 1.

In Embodiment 1, the UE in the present disclosure receives a first signaling, the first signaling being used for determining a first time-frequency resource; receiving a second signaling, the second signaling being used for determining a second time-frequency resource; and transmitting a first bit block in the first time-frequency resource, or transmitting a first bit block in the second time-frequency resource; herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, the first signaling is dynamically configured.

In one embodiment, the first signaling is a physical layer signaling.

In one embodiment, the first signaling is a DCI signaling.

In one embodiment, the first signaling is a Downlink Grant DCI signaling.

In one embodiment, the first signaling is transmitted on a downlink physical layer control channel (i.e., a downlink channel that can only be used for bearing a physical layer signaling).

In one sub-embodiment of the above embodiment, the downlink physical layer control channel is a Physical Downlink Control CHannel (PDCCH).

In one sub-embodiment of the above embodiment, the downlink physical layer control channel is a short PDCCH (sPDCCH).

In one sub-embodiment of the above embodiment, the downlink physical layer control channel is a New Radio PDCCH (NR-PDCCH).

In one sub-embodiment of the above embodiment, the downlink physical layer control channel is a Narrow Band PDCCH (NB-PDCCH).

In one embodiment, the first signaling is transmitted on a downlink physical layer data channel (i.e., a downlink channel that can be used for bearing physical layer data).

In one sub-embodiment of the present disclosure, the downlink physical layer data channel is a Physical Downlink Shared CHannel (PDSCH).

In one sub-embodiment of the present disclosure, the downlink physical layer data channel is a short PDSCH (sPDSCH).

In one sub-embodiment of the present disclosure, the downlink physical layer data channel is a New Radio PDSCH (NR-PDSCH).

In one sub-embodiment of the present disclosure, the downlink physical layer data channel is a Narrow Band PDSCH (NB-PDSCH).

In one embodiment, the first signaling is DCI format 1_0 or DCI format 1_1, the specific meaning of the DCI format 1_0 and DCI format 1_1 can be found in 3GPP TS38.212, chapter 7.3.1.2.

In one embodiment, the first signaling is DCI format 1_0, the specific meaning of the DCI format 1_0 can be found in 3GPP TS38.212, chapter 7.3.1.2.

In one embodiment, the first signaling is DCI format 1_1, the specific meaning of the DCI format 1_1 can be found in 3GPP TS38.212, chapter 7.3.1.2.

In one embodiment, the first signaling comprises a first field, the first field comprised in the first signaling is used for determining the first time-frequency resource.

In one sub-embodiment of the above embodiment, the first field comprised in the first signaling comprises a positive integer number of bit(s).

In one sub-embodiment of the above embodiment, the first field comprised in the first signaling is used for determining the first time-frequency resource out of a first time-frequency resource set, the first time-frequency resource set comprises a positive integer number of time-frequency resource(s).

In one sub-embodiment of the above embodiment, the first field comprised in the first signaling indicates an index of the first time-frequency resource in a first time-frequency resource set, the first time-frequency resource set comprises a positive integer number of time-frequency resource(s).

In one sub-embodiment of the above embodiment, the first field comprised in the first signaling is a PUCCH resource indicator, the specific meaning of the PUCCH resource indicator can be found in 3GPP TS38.213, chapter 9.2.3.

In one embodiment, the second signaling is DCI format 0_0 or DCI format 0_1, the specific meaning of the DCI format 0_0 and DCI format 0_1 can be found in 3GPP TS38.212, chapter 7.3.1.1.

In one embodiment, the second signaling is DCI format 0_0, the specific meaning of the DCI format 0_0 can be found in 3GPP TS38.212, chapter 7.3.1.1.

In one embodiment, the second signaling is DCI format 0_1, the specific meaning of the DCI format 0_1 can be found in 3GPP TS38.212, chapter 7.3.1.1.

In one embodiment, the second signaling is dynamically configured.

In one embodiment, the second signaling is a physical layer signaling.

In one embodiment, the second signaling is a DCI signaling.

In one embodiment, the second signaling is an UpLink Grant DCI signaling.

In one embodiment, the second signaling is transmitted on a downlink physical layer control channel (i.e., a downlink channel that can only be used for bearing a physical layer signaling).

In one sub-embodiment of the above embodiment, the downlink physical layer control channel is a PDCCH.

In one sub-embodiment of the above embodiment, the downlink physical layer control channel is an sPDCCH.

In one sub-embodiment of the above embodiment, the downlink physical layer control channel is an NR-PDCCH.

In one sub-embodiment of the above embodiment, the downlink physical layer control channel is an NB-PDCCH.

In one embodiment, the second signaling is transmitted on a downlink physical layer data channel (i.e., a downlink channel that can be used for bearing physical layer data).

In one sub-embodiment of the above embodiment, the downlink physical layer physical layer data channel is a PDSCH.

In one sub-embodiment of the above embodiment, the downlink physical layer physical layer data channel is an sPDSCH.

In one sub-embodiment of the above embodiment, the downlink physical layer physical layer data channel is an NR-PDSCH.

In one sub-embodiment of the above embodiment, the downlink physical layer physical layer data channel is an NB-PDSCH.

In one embodiment, the second signaling comprises a first field and a second field, the first field and the second field comprised in the second signaling are used for indicating the second time-frequency resource.

In one sub-embodiment of the above embodiment, the first field comprised in the second signaling comprises a positive integer number of bit(s), and the second field comprised in the second signaling comprises a positive integer number of bit(s).

In one sub-embodiment of the above embodiment, the first field comprised in the second signaling indicates frequency domain resource occupied by the second time-frequency resource.

In one sub-embodiment of the above embodiment, the second field comprised in the second signaling indicates time domain resource occupied by the second time-frequency resource.

In one sub-embodiment of the above embodiment, the first field and the second field comprised in the second signaling respectively refer to Frequency domain resource assignment and Time domain resource assignment, the specific meaning of the Frequency domain resource assignment and the Time domain resource assignment can be found in 3GPP TS38.214, chapter 6.1.2.

In one embodiment, the first identifier and the second identifier are two different signaling identifiers respectively.

In one embodiment, the first identifier and the second identifier are two different RNTIs respectively.

In one embodiment, the second identifier includes a Cell(C)-RNTI or a Configured Scheduling (CS)-RNTI, the first identifier includes a new-RNTI, the specific meaning of the new-RNTI can be found in 3GPP TS38.214, chapter 5.1.3.1.

In one embodiment, the first identifier includes one of multiple types of RNTI, the second identifier includes one type of RNTI other than the first identifier among the multiple types of RNTI.

In one sub-embodiment of the above embodiment, the multiple types of RNTI include at least two of C-RNTI, CS-RNTI and new-RNTI, the specific meaning of the new-RNTI can be found in 3GPP TS38.214, chapter 5.1.3.1.

In one sub-embodiment of the above embodiment, the multiple types of RNTI include at least one of C-RNTI or CS-RNTI, and new-RNTI, the specific meaning of the new-RNTI can be found in 3GPP TS38.214, chapter 5.1.3.1.

In one embodiment, the first identifier and the second identifier are two different non-negative integers respectively.

In one embodiment, the first signaling carries the first identifier or the second identifier.

In one sub-embodiment of the above embodiment, the first identifier or the second identifier is a signaling identifier for the first signaling.

In one sub-embodiment of the above embodiment, the first signaling is a DCI signaling identified by the first identifier or the second identifier.

In one sub-embodiment of the above embodiment, the first identifier or the second identifier is used for generating Reference Signal (RS) sequence of DeModulation Reference Signals (DMRS) for the first signaling.

In one sub-embodiment of the above embodiment, a Cyclic Redundancy Check (CRC) bit sequence for the first signaling is scrambled by the first identifier or the second identifier.

In one embodiment, the first signaling carries the first identifier.

In one sub-embodiment of the above embodiment, the first identifier is a signaling identifier for the first signaling.

In one sub-embodiment of the above embodiment, the first signaling is a DCI signaling identified by the first identifier.

In one sub-embodiment of the above embodiment, the first identifier is used for generating an RS sequence of DMRS for the first signaling.

In one sub-embodiment of the above embodiment, the CRC bit sequence for the first signaling is scrambled by the first identifier.

In one embodiment, the first signaling carries the second identifier.

In one sub-embodiment of the above embodiment, the second identifier is a signaling identifier for the first signaling.

In one sub-embodiment of the above embodiment, the first signaling is a DCI signaling identified by the second identifier.

In one sub-embodiment of the above embodiment, the second identifier is used for generating an RS sequence of DMRS for the first signaling.

In one sub-embodiment of the above embodiment, a CRC bit sequence for the first signaling is scrambled by the second identifier.

In one embodiment, the second signaling carries the first identifier or the second identifier.

In one sub-embodiment of the above embodiment, the first identifier or the second identifier is a signaling identifier for the second signaling.

In one sub-embodiment of the above embodiment, the second signaling is a DCI signaling identified by the first identifier or the second identifier.

In one sub-embodiment of the above embodiment, the first identifier or the second identifier is used for generating an RS sequence of DMRS for the second signaling.

In one sub-embodiment of the above embodiment, a CRC bit sequence for the second signaling is scramble by the first identifier or the second identifier.

In one embodiment, the second signaling carries the first identifier or the second identifier.

In one embodiment, the second signaling carries the first identifier.

In one sub-embodiment of the above embodiment, the first identifier is a signaling identifier for the second signaling.

In one sub-embodiment of the above embodiment, the second signaling is a DCI signaling identified by the first identifier.

In one sub-embodiment of the above embodiment, the first identifier is used for generating an RS sequence of DMRS for the second signaling.

In one sub-embodiment of the above embodiment, a CRC bit sequence for the second signaling is scrambled by the second identifier.

In one embodiment, the first time-frequency resource is a time-frequency resource belonging to an uplink physical layer control channel (i.e., an uplink channel that can only be used for bearing a physical layer signaling).

In one sub-embodiment of the above embodiment, the uplink physical layer control channel is a Physical Uplink Control CHannel (PUCCH).

In one sub-embodiment of the above embodiment, the uplink physical layer control channel is a short PUCCH (sPUCCH).

In one sub-embodiment of the above embodiment, the uplink physical layer control channel is a New Radio PUCCH (NR-PUCCH).

In one sub-embodiment of the above embodiment, the uplink physical layer control channel is a Narrow Band PUCCH (NB-PUCCH).

In one embodiment, the second time-frequency resource is a time-frequency resource belonging to an Uplink Shared Channel (UL-SCH).

In one embodiment, the second time-frequency resource is a time-frequency resource belonging to an uplink physical layer data channel (i.e., an uplink channel that can be used for bearing physical layer data).

In one sub-embodiment of the above embodiment, the uplink physical layer data channel is a Physical Uplink Shared CHannel (PUSCH).

In one sub-embodiment of the above embodiment, the uplink physical layer data channel is a short PUSCH (sPUSCH).

In one sub-embodiment of the above embodiment, the uplink physical layer data channel is a New Radio PUSCH (NR-PUSCH).

In one sub-embodiment of the above embodiment, the uplink physical layer data channel is a Narrow Band PUSCH (NB-PUSCH).

In one embodiment, the first time-frequency resource comprises a positive integer number of Resource Element(s) (REs).

In one embodiment, the first time-frequency resource comprises a positive integer number of multicarrier symbol(s) in time domain, the first time-frequency resource comprises a positive integer number of subcarrier(s) in frequency domain.

In one embodiment, the second time-frequency resource comprises a positive integer number of REs.

In one embodiment, the second time-frequency resource comprises a positive integer number of multicarrier symbol(s) in time domain, the first time-frequency resource comprises a positive integer number of subcarrier(s) in frequency domain.

In one embodiment, time domain resource occupied by the first time-frequency resource and time domain resource occupied by the second time-frequency resource are overlapping.

In one embodiment, time domain resource occupied by the first time-frequency resource and time domain resource occupied by the second time-frequency resource comprises at least one same multicarrier symbol.

In one embodiment, time domain resource occupied by the first time-frequency resource and time domain resource occupied by the second time-frequency resource belong to a first time window.

In one sub-embodiment of the above embodiment, the first time window comprises a slot.

In one sub-embodiment of the above embodiment, the first time window comprises a subframe.

In one sub-embodiment of the above embodiment, the first time window comprises multiple slots.

In one sub-embodiment of the above embodiment, the first time window comprises multiple subframes.

In one sub-embodiment of the above embodiment, the first time window comprises a positive integer number of multicarrier symbol(s).

In one embodiment, frequency domain resource occupied by the first time-frequency resource and frequency domain resource occupied by the second time-frequency resource are orthogonal or non-orthogonal.

In one sub-embodiment of the above embodiment, frequency domain resource occupied by the first time-frequency resource and frequency domain resource occupied by the second time-frequency resource are non-overlapping or overlapping.

In one sub-embodiment of the above embodiment, any subcarrier in frequency domain resource occupied by the first time-frequency resource does not belong to frequency domain resource occupied by the second time-frequency resource, or, frequency domain resource occupied by the first time-frequency resource and frequency domain resource occupied by the second time-frequency resources comprise at least one same subcarrier.

In one embodiment, frequency domain resource occupied by the first time-frequency resource and frequency domain resource occupied by the second time-frequency resource are orthogonal.

In one sub-embodiment of the above embodiment, frequency domain resource occupied by the first time-frequency resource and frequency domain resource occupied by the second time-frequency resource are non-overlapping.

In one sub-embodiment of the above embodiment, any subcarrier in frequency domain resource occupied by the first time-frequency resource does not belong to frequency domain resource occupied by the second time-frequency resource.

In one embodiment, frequency domain resource occupied by the first time-frequency resource and frequency domain resource occupied by the second time-frequency resource are non-orthogonal.

In one sub-embodiment of the above embodiment, frequency domain resource occupied by the first time-frequency resource and frequency domain resource occupied by the second time-frequency resource are overlapping.

In one sub-embodiment of the above embodiment, frequency domain resource occupied by the first time-frequency resource and frequency domain resource occupied by the second time-frequency resource comprise at least one same subcarrier.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

Embodiment 2

Figure 2:
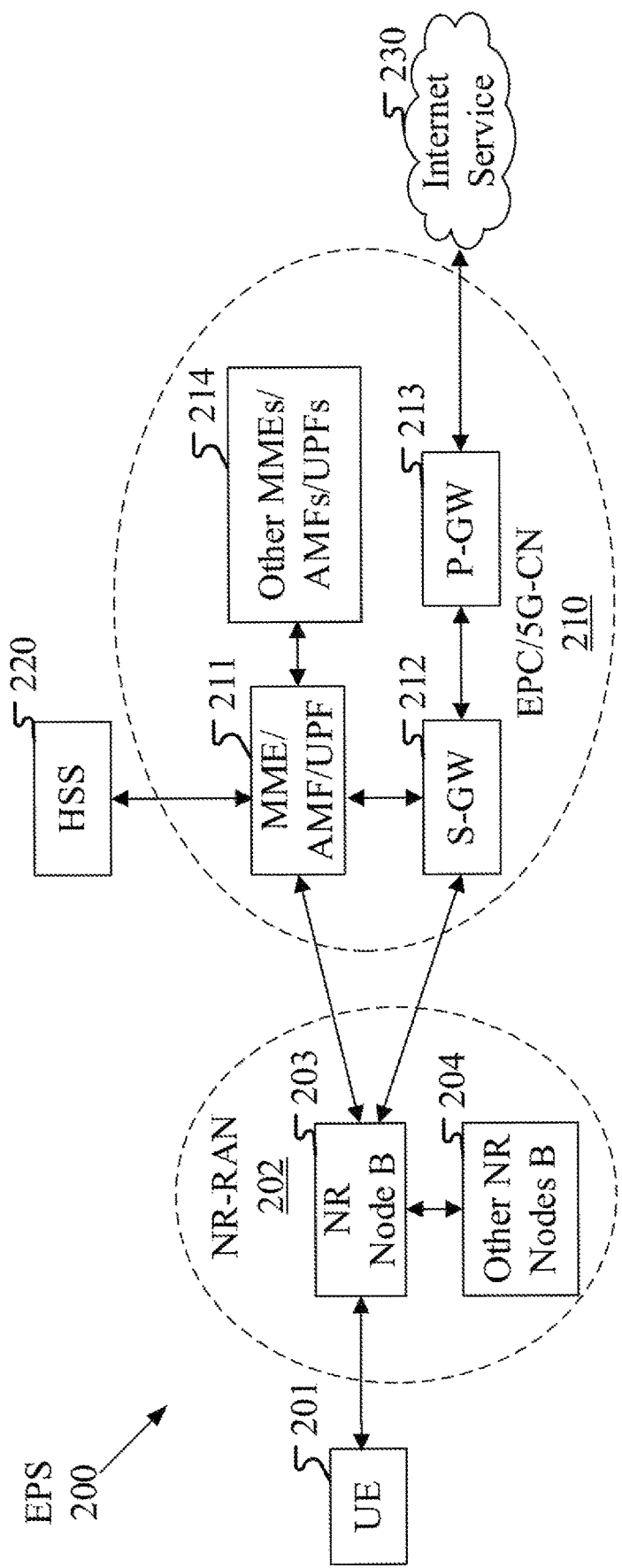
FIG. 2 illustrates a schematic diagram of a network according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other applicable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the UE in the present disclosure.

In one embodiment, the gNB 203 corresponds to the base station in the present disclosure.

In one sub-embodiment, the UE 201 supports massive MIMO wireless communication.

In one sub-embodiment, the gNB 203 supports massive MIMO wireless communication.

Embodiment 3

Figure 3:
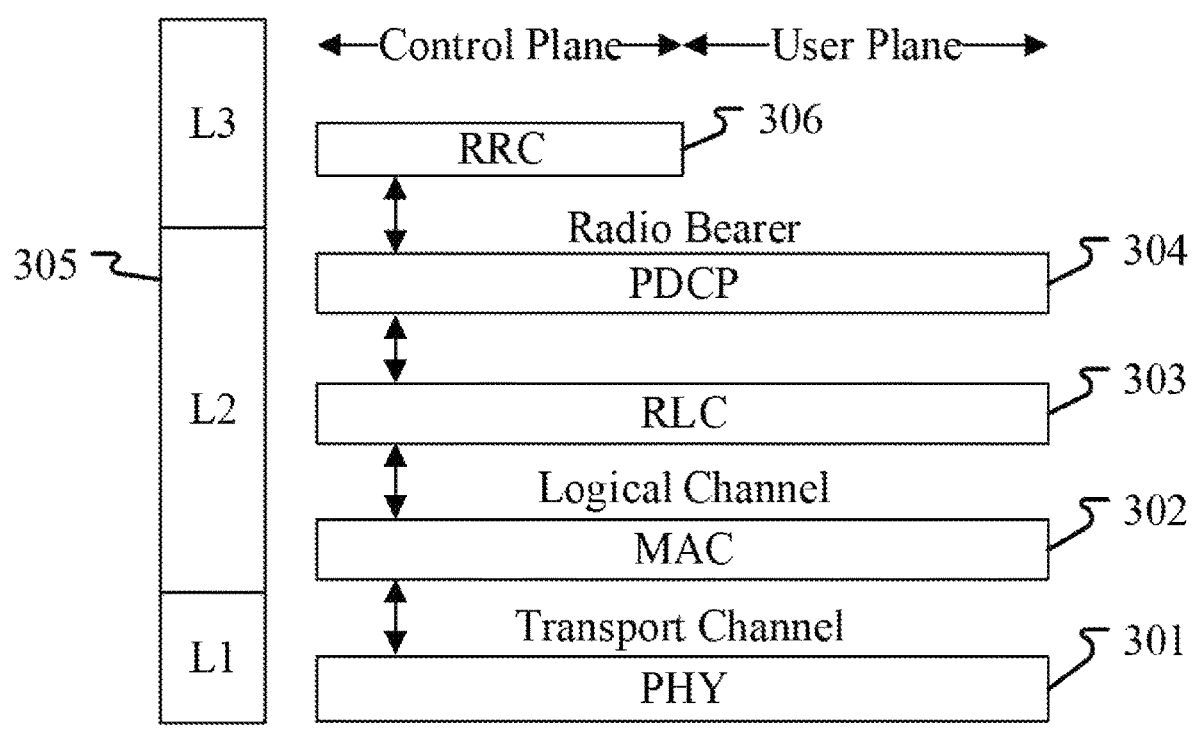
FIG. 3 illustrates a schematic diagram of an example of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARD). The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling is generated by the PHY 301.

In one embodiment, the second signaling is generated by the PHY 301.

In one embodiment, a radio signal bearing the first bit block in the present disclosure is generated by the PHY 301.

In one embodiment, the first information in the present disclosure is generated by the RRC sublayer 306.

In one embodiment, the second information in the present disclosure is generated by the RRC sublayer 306.

In one embodiment, the second information in the present disclosure is generated by the PHY 301.

In one embodiment, the third information in the present disclosure is generated by the RRC sublayer 306.

In one embodiment, the fourth information in the present disclosure is generated by the RRC sublayer 306.

In one embodiment, the fourth information in the present disclosure is generated by the MAC sublayer 302.

In one embodiment, the first radio signal in the present disclosure is generated by the PHY 301.

In one embodiment, the second radio signal in the present disclosure is generated by the PHY 301.

In one embodiment, the third radio signal in the present disclosure is generated by the PHY 301.

In one embodiment, the fourth radio signal in the present disclosure is generated by the PHY 301.

Embodiment 4

Figure 4:
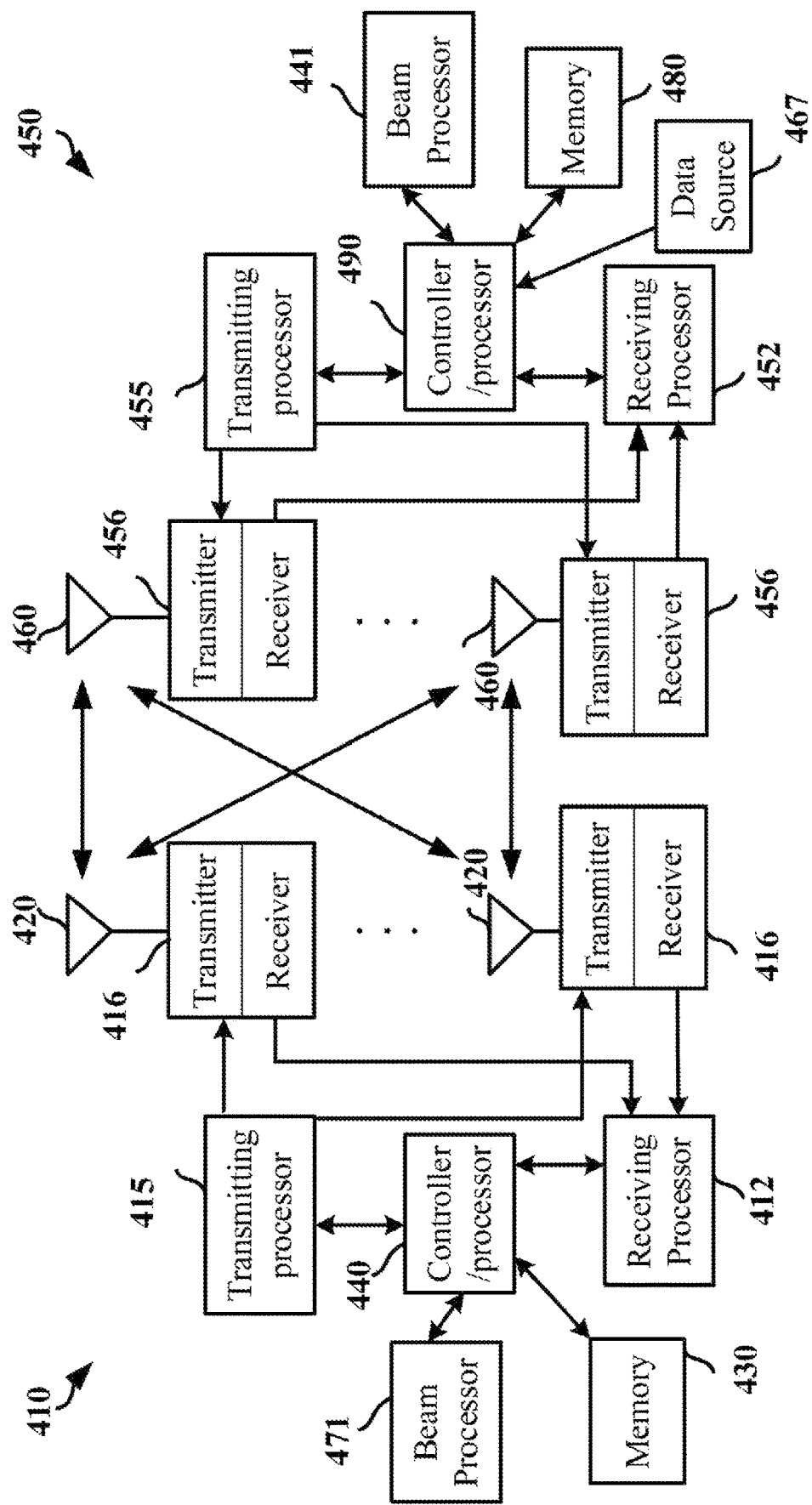
FIG. 4 illustrates a schematic diagram of a New Radio (NR) node and a UE according to one embodiment of the present disclosure.

Embodiment 4 illustrates a schematic diagram of a base station and a UE according to the present disclosure, as shown in FIG. 4. FIG. 4 is a block diagram of a gNB 410 in communication with a UE 450 in access network.

The base station (410) comprises a controller/processor 440, a memory 430, a receiving processor 412, a beam processor 471, a transmitting processor 415, a transmitter/receiver 416 and an antenna 420.

The UE (450) comprises a controller/processor 490, memory 480, a data source 467, a beam processor 441, a transmitting processor 455, a receiving processor 452, a transmitter/receiver 456 and an antenna 460.

In downlink (DL) transmission, processes relevant to the base station (410) include the following:

A higher layer packet is provided to the controller/processor 440, the controller/processor provides header compression, encryption, packet segmentation and reordering, and a multiplexing between a logical channel and a transport channel so as to implements the L2 layer protocols used for the user plane and the control plane; the higher layer packet may comprise data or control information, such as a Downlink Shared Channel (DL-SCH);

the controller/processor 440 is connected to the memory 430 that stores program codes and data, the memory 430 may be called a computer readable medium;

the controller/processor 440 comprises scheduling units for transmission requests, the scheduling units are used for scheduling radio resources corresponding to transmission requests.

the beam processor 471 determines a first signaling and a second signaling;

the transmitting processor 415 receives a bit stream output from the controller/processor 440, and performs signal transmitting procession functions of the L1 layer (that is, PHY), including coding, interleaving, scrambling, modulation, power control/allocation and generation of physical layer control signaling (such as PBCH, PDCCH, PHICH, PCFICH, reference signal), etc.

the transmitting processor 415 receives a bit stream output from the controller/processor 440, and performs signal transmitting procession functions of the L1 layer (that is, PHY), including multi-antenna transmission, spreading, code division multiplexing, and precoding.

the transmitter 416 is configured to convert the baseband signal provided by the transmitting processor 415 into a radio frequency signal to be transmitted via the antenna 420; each transmitter 416 performs sampling processing on respective input symbol streams to obtain respective sampled signal streams. Each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

The receiver 456 is configured to convert the radio frequency signal received by the antenna 460 into a baseband signal and provide the baseband signal to the receiving processor 452;

the receiving processor 452 implements various signal receiving processing functions used for the L1 layer (that is, PHY), including decoding, deinterleaving, descrambling, demodulation and extraction of physical layer control signaling;

the receiving processor 452 implements various signal receiving processing functions used for the L1 layer (that is, PHY), including multi-antenna reception, dispreading, code division multiplexing, and precoding;

the beam processor 441 determines a first signaling and a second signaling;

the controller/processor 490 receives a bit stream output from the receiving processor 452, provides header decompression, decryption, packet segmentation and reordering as well as a multiplexing and demultiplexing between a logical channel and a transport channel so as to implement the L2 layer protocols for the user plane and the control plane;

the controller/processor 490 is connected to the memory 480 that stores program codes and data. The memory 480 may be called a computer readable medium.

In uplink (UL) transmission, processes relevant to the base station (410) include the following:

The receiver 416 receives a radio frequency signal via a corresponding antenna 420, converts the received radio frequency signal into a baseband signal, and provides the baseband signal to the receiving processor 412;

the receiving processor 412 performs various signal receiving processing functions for the L1 layer (that is, PHY), including decoding, deinterleaving, descrambling, demodulation and extraction of physical layer control signaling;

the receiving processor 412 performs various signal receiving processing functions for the L1 layer (that is, PHY), including multi-antenna reception, dispreading, code division multiplexing, and precoding, etc.;

the controller/processor 440 implements the functionality of the L2 layer, and is connected to the memory 430 that stores program codes and data;

the controller/processor 440 provides demultiplexing between a transport channel and a logical channel, packet reassembling, decryption, header decompression, and control signal processing to recover a higher layer packet coming from the UE 450; a higher layer packet from the controller/processor 440 can be provided to the core network;

the beam processor 471 determines that a first bit block is received in a first time-frequency resource, or, a first bit block is received in a second time-frequency resource.

In UL transmission, processes relevant to the UE (450) include the following:

The data source 467 provides a higher layer packet to the controller/processor 490. The data source 467 represents all protocol layers above the L2 layer;

the transmitter 456 transmits a radio frequency signal via a corresponding antenna 460, converting the baseband signal into a radio frequency signal, and providing the radio frequency signal to a corresponding antenna 460;

the transmitting processor 455 performs various signal receiving processing functions for the L1 layer (that is, PHY), including coding, interleaving, scrambling, modulation and physical layer signaling generation;

the transmitting processor 455 performs various signal receiving processing functions for the L1 layer (that is, PHY), including multi-antenna transmission, spreading, code division multiplexing, and precoding;

the controller/processor 490 performs based on radio resource allocation for the gNB 410 header compression, encryption, packet segmentation and reordering and multiplexing between a logical channel and a transport channel, so as to implement the L2 functionality used for the user plane and the control plane;

the controller/processor 490 is also in charge of HARQ operation, retransmission of a lost packet, and a signaling to the gNB 410;

the beam processor 441 determines that a first bit block is transmitted in a first time-frequency resource, or, a first bit block is transmitted in a second time-frequency resource.

In one embodiment, the UE 450 comprises at least one processor and at least one memory. The at least one memory comprises computer program codes; the at least one memory and the computer program codes are configured to be used in collaboration with the at least one processor. The UE 450 at least receives a first signaling, the first signaling being used to determine a first time-frequency resource; receives a second signaling, the second signaling being used to determine a second time-frequency resource; and transmits a first bit block in the first time-frequency resource, or, transmits a first bit block in the second time-frequency resource. Herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, the UE 450 comprises a memory that stores a computer readable instruction program. The computer readable instruction program generates an action when executed by at least one processor. The action includes receiving a first signaling, the first signaling being used to determine a first time-frequency resource; receiving a second signaling, the second signaling being used to determine a second time-frequency resource; and transmitting a first bit block in the first time-frequency resource, or, transmitting a first bit block in the second time-frequency resource. Herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, the gNB 410 comprises at least one processor and at least one memory. The at least one memory comprises computer program codes. The at least one memory and the computer program codes are configured to be used in collaboration with the at least one processor. The gNB 410 at least transmits a first signaling, the first signaling being used for determining a first time-frequency resource; transmits a second signaling, the second signaling being used for determining a second time-frequency resource; and receives a first bit block in the first time-frequency resource, or, receiving a first bit block in the second time-frequency resource. Herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, the gNB 410 comprises a memory that stores a computer readable instruction program. The computer readable instruction program generates an action when executed by at least one processor. The action includes transmitting a first signaling, the first signaling being used for determining a first time-frequency resource; transmitting a second signaling, the second signaling being used for determining a second time-frequency resource; and receiving a first bit block in the first time-frequency resource, or, receiving a first bit block in the second time-frequency resource. Herein, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, the UE 450 corresponds to the UE in the present disclosure.

In one embodiment, the base station corresponds to the base station in the present disclosure.

In one embodiment, at least the first two of the receiver 456, the receiving processor 452 and the controller/processor 490 are used for receiving the first signaling in the present disclosure.

In one embodiment, at least the first two of the transmitter 416, the transmitting processor 415 and the controller/processor 440 are used for transmitting the first signaling in the present disclosure.

In one embodiment, at least the first two of the receiver 456, the receiving processor 452 and the controller/processor 490 are used for receiving the second signaling in the present disclosure.

In one embodiment, at least the first two of the transmitter 416, the transmitting processor 415 and the controller/processor 440 are used for transmitting the second signaling in the present disclosure.

In one embodiment, at least the first two of the receiver 456, the receiving processor 452 and the controller/processor 490 are used for receiving the first information in the present disclosure.

In one embodiment, at least the first two of the transmitter 416, the transmitting processor 415 and the controller/processor 440 are used for transmitting the first information in the present disclosure.

In one embodiment, at least the first two of the receiver 456, the receiving processor 452 and the controller/processor 490 are used for receiving the second information in the present disclosure.

In one embodiment, at least the first two of the transmitter 416, the transmitting processor 415 and the controller/processor 440 are used for transmitting the second information in the present disclosure.

In one embodiment, at least the first two of the receiver 456, the receiving processor 452 and the controller/processor 490 are used for receiving the third information in the present disclosure.

In one embodiment, at least the first two of the transmitter 416, the transmitting processor 415 and the controller/processor 440 are used for transmitting the third information in the present disclosure.

In one embodiment, at least the first two of the receiver 456, the receiving processor 452 and the controller/processor 490 are used for receiving the fourth information in the present disclosure.

In one embodiment, at least the first two of the transmitter 416, the transmitting processor 415 and the controller/processor 440 are used for transmitting the fourth information in the present disclosure.

In one embodiment, at least the first two of the receiver 456, the receiving processor 452 and the controller/processor 490 are used for receiving the first radio signal in the present disclosure.

In one embodiment, at least the first two of the transmitter 416, the transmitting processor 415 and the controller/processor 440 are used for transmitting the first radio signal in the present disclosure.

In one embodiment, at least the first two of the receiver 456, the receiving processor 452 and the controller/processor 490 are used for receiving the third radio signal in the present disclosure.

In one embodiment, at least the first two of the transmitter 416, the transmitting processor 415 and the controller/processor 440 are used for transmitting the third radio signal in the present disclosure.

In one embodiment, at least the first two of the transmitter 456, the transmitting processor 452 and the controller/processor 490 are used for transmitting the first bit block in the present disclosure.

In one embodiment, at least the first two of the receiver 416, the receiving processor 415 and the controller/processor 440 are used for receiving the first bit block in the present disclosure.

In one embodiment, at least the first two of the transmitter 456, the transmitting processor 452 and the controller/processor 490 are used for transmitting the second radio signal in the present disclosure.

In one embodiment, at least the first two of the receiver 416, the receiving processor 415 and the controller/processor 440 are used for receiving the second radio signal in the present disclosure.

In one embodiment, at least the first two of the transmitter 456, the transmitting processor 455 and the controller/processor 490 are used for transmitting the first bit block of the present disclosure in the second time-frequency resource of the present disclosure.

In one embodiment, at least the first two of the receiver 416, the receiving processor 412 and the controller/processor 440 are used for receiving the first bit block of the present disclosure in the second time-frequency resource of the present disclosure.

In one embodiment, at least the first two of the transmitter 456, the transmitting processor 455 and the controller/processor 490 are used for transmitting the second radio signal of the present disclosure in the second time-frequency resource of the present disclosure.

In one embodiment, at least the first two of the receiver 416, the receiving processor 412 and the controller/processor 440 are used for receiving the second radio signal of the present disclosure in the second time-frequency resource of the present disclosure.

In one embodiment, at least the first two of the transmitter 456, the transmitting processor 455 and the controller/processor 490 are used for transmitting the first radio sub-signal of the present disclosure in the second time-frequency resource of the present disclosure.

In one embodiment, at least the first two of the receiver 416, the receiving processor 412 and the controller/processor 440 are used for receiving the first radio sub-signal of the present disclosure in the second time-frequency resource of the present disclosure.

In one embodiment, at least the first two of the transmitter 456, the transmitting processor 455 and the controller/processor 490 are used for transmitting the fourth radio signal in the present disclosure.

In one embodiment, at least the first two of the receiver 416, the receiving processor 412 and the controller/processor 440 are used for receiving the fourth radio signal in the present disclosure.

Embodiment 5

Figure 5:
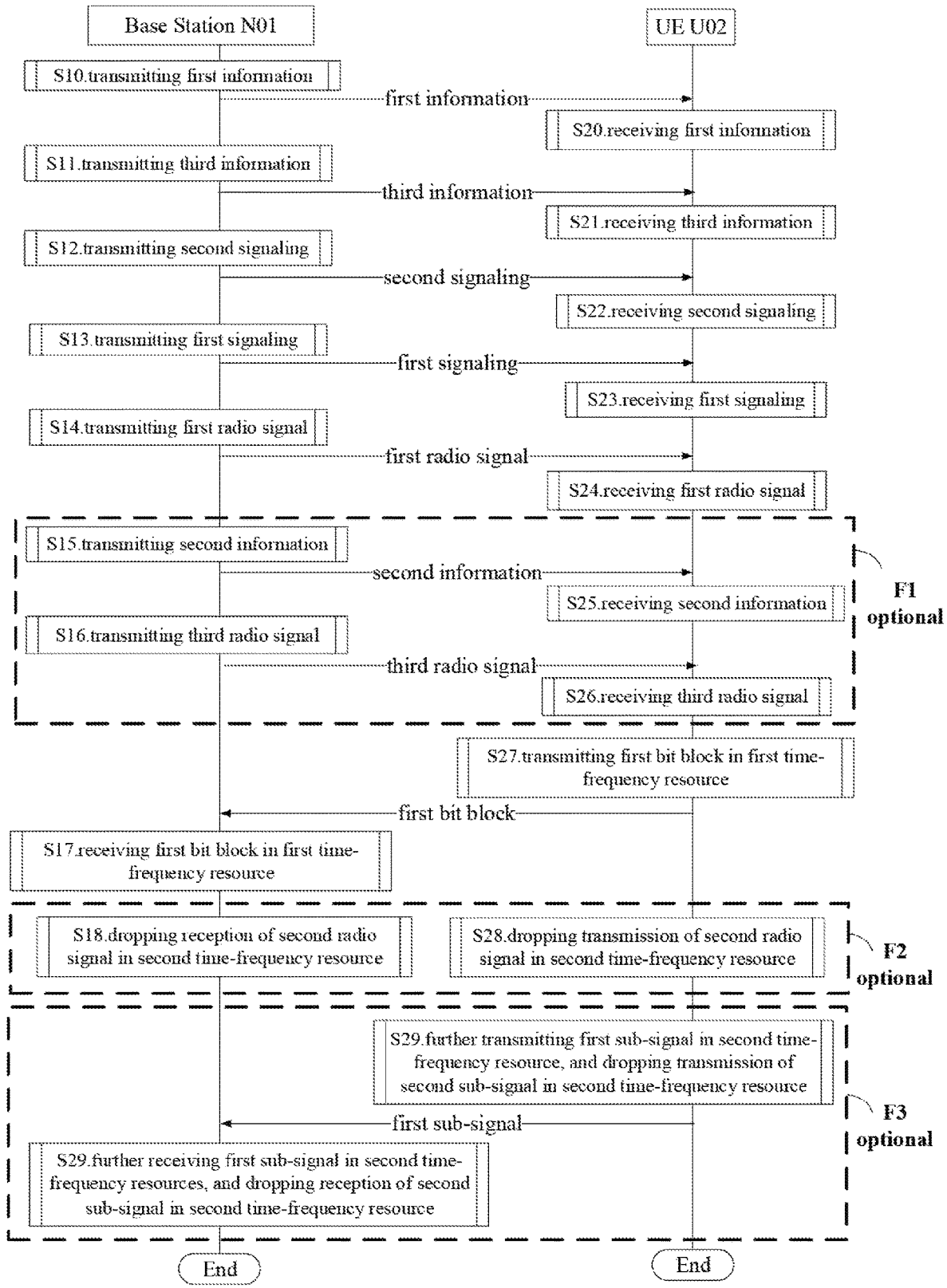
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, boxes F1, F2 and F3 are optional.

The N01 transmits first information in step S10; transmits third information in step S11; transmits a second signaling in step S12; transmits a first signaling in step S13; transmits a first radio signal in step S14; transmits second information in step S15; transmits a third radio signal in step S16; receives a first bit block in a first time-frequency resource in step S17; drops receiving a second radio signal in step S18; and also receives a first sub-signal and drops receiving a second sub-signal in a second time-frequency resource in step S19.

The U02 receives first information in step S20; receives third information in step S21; receives a second signaling in step S22; receives a first signaling in step S23; receives a first radio signal in step S24; receives second information in step S25; receives a third radio signal in step S26; transmits a first bit block in a first time-frequency resource in step S27; drops transmitting a second radio signal in a second time-frequency resource in step S28; and also transmits a first sub-signal and drops transmitting a second sub-signal in a second time-frequency resource in step S29.

In Embodiment 5, time domain resource occupied by the first time-frequency resource and time domain resource occupied by the second time-frequency resource are non-orthogonal; the first signaling carries a first identifier or a second identifier; whether the first signaling carries the first identifier or the second identifier is used by the U02 to determine whether the first bit block is transmitted in the first time-frequency resource or transmitted in the second time-frequency resource. The first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received. The second signaling is further used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource. The second information is used by the U02 for determining configuration information of the third radio signal; the first bit block comprises a first bit sub-block and a second bit sub-block, the first bit sub-block is used for indicating whether the first radio signal is correctly received, the second bit sub-block is acquired based on a measurement(s) on the third radio signal. The third information is used for indicating N time-frequency resource sets, the first time-frequency resource is related to a first time-frequency resource set, the first time-frequency resource set is one of the N time-frequency resource sets; a number of bits comprised in the first bit block is used for determining the first time-frequency resource set out of the N time-frequency resource sets. N is a positive integer greater than 1.

In one embodiment, only one box exists between box F2 and box F3.

In one embodiment, the first information is semi-statically configured.

In one embodiment, the first information is carried by a higher layer signaling.

In one embodiment, the first information is carried by an RRC signaling.

In one embodiment, the first information comprises one or more Information Elements (IEs) of an RRC signaling.

In one embodiment, the first information comprises all or part of an IE of an RRC signaling.

In one embodiment, the first information comprises multiple IEs of an RRC signaling.

In one embodiment, the first information explicitly indicates the first identifier.

In one embodiment, the first information implicitly indicates the first identifier.

In one embodiment, the first information is used for indicating the first identifier and the second identifier.

In one embodiment, the first information explicitly indicates the first identifier and the second identifier.

In one embodiment, the first information implicitly indicates the first identifier and the second identifier.

In one embodiment, the first radio signal comprises data.

In one embodiment, the first radio signal comprises data and DMRS.

In one embodiment, the data comprised in the first radio signal is downlink data.

In one embodiment, a transmission channel for the first radio signal is a DL-SCH.

In one embodiment, the first radio signal is transmitted on a downlink physical layer data channel (i.e., a downlink channel that can be used for bearing physical layer data).

In one sub-embodiment of the above embodiment, the downlink physical layer data channel is a PDSCH.

In one sub-embodiment of the above embodiment, the downlink physical layer data channel is an sPDSCH.

In one sub-embodiment of the above embodiment, the downlink physical layer data channel is an NR-PDSCH.

In one sub-embodiment of the above embodiment, the downlink physical layer data channel is an NB-PDSCH.

In one embodiment, the first bit block comprises a positive integer number of bit(s).

In one embodiment, the first bit block carries at least HARQ-ACK feedback between HARQ-ACK feedback and CSI.

In one embodiment, the first bit block carries HARQ-ACK feedback.

In one embodiment, the first bit block carries HARQ-ACK feedback and CSI.

In one embodiment, the first bit block is used for indicating whether the first radio signal is correctly received.

In one embodiment, the first bit block explicitly indicates whether the first radio signal is correctly received.

In one embodiment, the first bit block implicitly indicates whether the first radio signal is correctly received.

In one embodiment, the first bit block carries HARQ-ACK feedback for the first radio signal.

In one embodiment, part or all of bits in the first bit block is HARQ-ACK feedback for the first radio signal.

In one embodiment, the target modulation and coding scheme set comprises a positive integer number of Modulation and Coding Scheme(s) (MCS).

In one embodiment, the first signaling comprises a second field, the second field comprised in the first signaling is used for indicating an MCS adopted by the first radio signal out of the target modulation and coding scheme set.

In one sub-embodiment of the above embodiment, the second field comprised in the first signaling comprises a positive integer number of bit(s).

In one sub-embodiment of the above embodiment, the second field comprised in the first signaling indicates an index of an MCS adopted by the first radio signal in the target modulation and coding scheme set.

In one sub-embodiment of the above embodiment, the second field comprised in the first signaling is a Modulation and coding scheme, the specific meaning of the Modulation and coding scheme can be found in 3GPP TS38.214, chapter 5.1.3.

In one embodiment, X is equal to 2.

In one embodiment, X is greater than 2.

In one embodiment, X alternative modulation and coding scheme sets are pre-defined.

In one embodiment, there are two modulation and coding scheme sets among the X modulation and coding schemes that have different target BLERs.

In one embodiment, the first identifier and the second identifier respectively correspond to different modulation and coding scheme sets of the X alternative modulation and coding scheme sets, a target BLER of the target modulation and coding scheme set is less than that of a modulation and coding scheme set corresponding to the second identifier among the X alternative modulation and coding scheme sets.

In one sub-embodiment of the above embodiment, a target BLER of a modulation and coding scheme set corresponding to the second identifier among the X alternative modulation and coding scheme sets is equal to 0.1.

In one sub-embodiment of the above embodiment, a target BLER of the target modulation and coding scheme set is less than 0.1.

In one sub-embodiment of the above embodiment, a target BLER of the target modulation and coding scheme set is 0.00001.

In one sub-embodiment of the above embodiment, a target BLER of the target modulation and coding scheme set is 0.000001.

In one embodiment, if the first bit block is transmitted in the second time-frequency resource, then a second radio signal is also transmitted in the second time-frequency resource; if the first bit block is transmitted in the first time-frequency resource, then transmission of a second radio signal in the second time-frequency resource is dropped.

In one embodiment, if the first bit block is transmitted in the second time-frequency resource, then a second radio signal is also transmitted in the second time-frequency resource; if the first bit block is transmitted in the first time-frequency resource, then a first sub-signal is also transmitted in the second time-frequency resource, and transmission of a second sub-signal in the second time-frequency resource is dropped.

In one embodiment, if the first bit block is transmitted in the first time-frequency resource, then transmission of a second radio signal in the second time-frequency resource is dropped.

In one embodiment, if the first bit block is transmitted in the first time-frequency resource, then a first sub-signal is also transmitted in the second time-frequency resource, and transmission of a second sub-signal in the second time-frequency resource is dropped.

In one embodiment, the scheduling information of the second radio signal includes at least one of time domain resource occupied, frequency domain resource occupied, an MCS, configuration information of DMRS, a HARQ process number, an RV, an NDI, a transmitting antenna port, corresponding multi-antenna relevant transmission, or corresponding multi-antenna reception.

In one sub-embodiment of the above embodiment, the configuration information of the DMRS comprised by the scheduling information of the second radio signal includes at least one of an RS sequence, a mapping mode, DMRS type, time domain resource occupied, frequency domain resource occupied, code domain resources occupied, cyclic shift or Orthogonal Cover Code (OCC).

In one sub-embodiment of the above embodiment, the second signaling comprises a first field, the first field comprised in the second signaling indicates the occupied frequency domain resource comprised in the scheduling information of the second radio signal.

In one sub-embodiment of the above embodiment, the second signaling comprises a second field, the second field comprised in the second signaling indicates the occupied time domain resource comprised in the scheduling information of the second radio signal.

In one sub-embodiment of the above embodiment, the occupied time domain resource comprised in the scheduling information of the second radio signal is the time domain resource occupied by the second time-frequency resource.

In one sub-embodiment of the above embodiment, the occupied frequency domain resource comprised in the scheduling information of the second radio signal is the frequency domain resource occupied by the second time-frequency resource.

In one embodiment, the multi-antenna relevant reception refers to Spatial Rx parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving analog beamforming vector.

In one embodiment, the multi-antenna relevant reception refers to a receiving beamforming vector.

In one embodiment, the multi-antenna relevant reception refers to receiving spatial filtering.

In one embodiment, the multi-antenna relevant transmission refers to Spatial Tx parameters.

In one embodiment, the multi-antenna relevant transmission refers to a transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting analog beamforming vector.

In one embodiment, the multi-antenna relevant transmission refers to a transmitting beamforming vector.

In one embodiment, the multi-antenna relevant transmission refers to a transmitting spatial filtering.

In one embodiment, the Spatial Tx parameters include one or more of a transmitting antenna port, a transmitting antenna port set, a transmitting beam, a transmitting analog beamforming matrix, a transmitting analog beamforming vector, a transmitting beamforming matrix, a transmitting beamforming vector and transmitting spatial filtering.

In one embodiment, Spatial Rx parameters includes one or more of a receiving beam, a receiving analog beamforming matrix, a receiving analog beamforming vector, a receiving beamforming matrix, a receiving beamforming vector and a receiving spatial filtering.

In one embodiment, the second radio signal comprises data.

In one embodiment, the second radio signal comprises data and DMRS.

In one embodiment, the data comprised in the second radio signal is uplink data.

In one embodiment, a transmission channel for the second radio signal is a UL-SCH.

In one embodiment, the second radio signal is transmitted on an uplink physical layer data channel (i.e., an uplink channel that can be used for bearing physical layer data).

In one sub-embodiment of the above embodiment, the uplink physical layer data channel is a PUSCH.

In one sub-embodiment of the above embodiment, the uplink physical layer data channel is an sPUSCH.

In one sub-embodiment of the above embodiment, the uplink physical layer data channel is an NR-PUSCH.

In one sub-embodiment of the above embodiment, the uplink physical layer data channel is an NB-PUSCH.

In one embodiment, if the first bit block is transmitted in the second time-frequency resource, radio signals transmitted in the second time-frequency resource comprise the second radio signal and a radio signal bearing the first bit block.

In one embodiment, if the first bit block is transmitted in the second time-frequency resource, a radio signal transmitted in the second time-frequency resource bears a first bit block set, the first bit block set comprises the first bit block and a second bit block; the second radio signal bears the second bit block.

In one embodiment, if the first bit block is transmitted in the second time-frequency resource, a radio signal transmitted in the second time-frequency resource bears a first bit block set, the first bit block set comprises the first bit block and a second bit block; the second bit block belongs to a transport block (TB), the second radio signal bears the second bit block.

In one embodiment, a TB is used for generating the second radio signal.

In one embodiment, part of bits comprised in a TB are used for generating the second radio signal.

In one embodiment, the first bit sub-block comprises a positive integer number of bit(s), the second bit sub-block comprises a positive integer number of bit(s).

In one embodiment, the first bit sub-block bears HARQ-ACK feedback.

In one embodiment, the second bit sub-block bears HARQ-ACK feedback or CSI feedback.

In one embodiment, the second bit sub-block bears HARQ-ACK feedback.

In one embodiment, the second bit sub-block bears CSI feedback.

In one embodiment, the second information is semi-statically configured.

In one embodiment, the second information is carries by a higher layer signaling.

In one embodiment, the second information is carried by an RRC signaling.

In one embodiment, the second information comprises one or more IEs of an RRC signaling.

In one embodiment, the second information comprises all or part of an IE of an RRC signaling.

In one embodiment, the second information comprises multiple IEs of an RRC signaling.

In one embodiment, the second information is dynamically configured.

In one embodiment, the second information is carried by a physical layer signaling.

In one embodiment, the second information belongs to DCI.

In one embodiment, the second information comprises a positive integer number of field(s) in a piece of DCI, the field(s) comprises(comprise) a positive integer number of bit(s).

In one embodiment, the third radio signal comprises data, or the third radio signal comprises data and DMRS.

In one sub-embodiment of the above embodiment, the data comprised in the third radio signal is downlink data.

In one sub-embodiment of the above embodiment, the second information is dynamically configured.

In one sub-embodiment of the above embodiment, the second information belongs to DCI.

In one sub-embodiment of the above embodiment, the second information comprises a positive integer number of field(s) in a piece of DCI, the field(s) comprises(comprise) a positive integer number of bit(s).

In one embodiment, the third radio signal includes a reference signal.

In one sub-embodiment of the above embodiment, the reference signal included by the third radio signal includes a Channel State Information-Reference Signal (CSI-RS).

In one sub-embodiment of the above embodiment, the reference signal included by the third radio signal includes a CSI-RS and a CSI-interference measurement resource (CSI-IMR).

In one sub-embodiment of the above embodiment, the second information is semi-statically configured.

In one sub-embodiment of the above embodiment, the second information is carried by a higher layer signaling.

In one sub-embodiment of the above embodiment, the second information is carried by an RRC signaling.

In one-embodiment of the above embodiment, the second information comprises one or more IEs of an RRC signaling.

In one-embodiment of the above embodiment, the second information comprises all or part of an IE of an RRC signaling.

In one-embodiment of the above embodiment, the second information comprises multiple IEs of an RRC signaling.

In one-embodiment of the above embodiment, the second information is dynamically configured.

In one-embodiment of the above embodiment, the second information belongs to DCI.

In one-embodiment of the above embodiment, the second information comprises a positive integer number of field(s) in a piece of DCI, the field(s) comprises(comprise) a positive integer number of bit(s).

In one embodiment, the configuration information of the third radio signal comprises at least one of time domain resource occupied, frequency domain resource occupied, an MCS, configuration information of DMRS, a HARQ process number, an RV, an NDI, a transmitting antenna port, corresponding multi-antenna relevant transmission, or corresponding multi-antenna reception.

In one sub-embodiment of the above embodiment, the third radio signal comprises data, or the third radio signal comprises data and DMRS.

In one sub-embodiment of the above embodiment, the configuration information of the DMRS comprised by the configuration information of the third radio signal includes at least one of an RS sequence, a mapping mode, DMRS type, time domain resource occupied, frequency domain resource occupied, code domain resources occupied, cyclic shift or OCC.

In one sub-embodiment of the above embodiment, the second information indicates the configuration information of the third radio signal.

In one embodiment, a transmission channel for the third radio signal is a DL-SCH.

In one embodiment, the third radio signal is transmitted on a downlink physical layer data channel (i.e., a downlink channel that can be used for bearing physical layer data).

In one sub-embodiment of the above embodiment, the downlink physical layer data channel is a PDSCH.

In one sub-embodiment of the above embodiment, the downlink physical layer data channel is an sPDSCH.

In one sub-embodiment of the above embodiment, the downlink physical layer data channel is an NR-PDSCH.

In one sub-embodiment of the above embodiment, the downlink physical layer data channel is an NB-PDSCH.

In one embodiment, the configuration information of the third radio signal comprises at least one of time domain resource occupied, frequency domain resource occupied, code domain resources occupied, cyclic shift, OCC, an occupied antenna port, transmission type, corresponding multi-antenna relevant transmission, or corresponding multi-antenna reception.

In one sub-embodiment of the above embodiment, the third radio signal includes a reference signal.

In one sub-embodiment of the above embodiment, the third radio signal includes a CSI-RS.

In one sub-embodiment of the above embodiment, the third radio signal includes a CSI-RS and a CSI-IMR.

In one sub-embodiment of the above embodiment, the transmission type, is one of periodic transmission, semi-periodic transmission or aperiodic transmission.

In one sub-embodiment of the above embodiment, the second information is carried by a higher layer signaling, the second information indicates the configuration information of the third radio signal.

In one sub-embodiment of the above embodiment, the second information is carries by a physical layer signaling, the second information indicates a piece of first CSI, the first CSI is acquired based on a measurement(s) on the third radio signal, the configuration information of the third radio signal is carried by a higher signaling.

In one sub-embodiment of the above embodiment, the second information is carries by a DCI signaling, the configuration information of the third radio signal is carried by a higher layer signaling; the second information is a CSI request field, the specific meaning of the CSI request can be found in 3GPP TS38.212, chapter 7.3.1.1.

In one embodiment, the second bit sub-block is used for indicating whether the third radio signal is correctly received.

In one sub-embodiment of the above embodiment, the third radio signal comprises data, or the third radio signal comprises data and DMRS.

In one sub-embodiment of the above embodiment, the second bit sub-block bears HARQ-ACK feedback.

In one embodiment, the second bit sub-block is used for indicating CSI acquired based on a measurement(s) on the third radio signal.

In one sub-embodiment of the above embodiment, the third radio signal includes a reference signal.

In one sub-embodiment of the above embodiment, the third radio signal includes a CSI-RS.

In one sub-embodiment of the above embodiment, the third radio signal includes a CSI-RS and a CSI-IMR.

In one sub-embodiment of the above embodiment, the CSI comprises at least one of Rank indication (RI), a Precoding matrix indicator (PMI), a Channel quality indicator (CQI), or a Csi-reference signal Resource Indicator (CRI).

In one sub-embodiment of the above embodiment, the second bit sub-block bears CSI feedback.

In one sub-embodiment of the above embodiment, a measurement(s) on the third radio signal includes a channel measurement, the channel measurement is used for generating the CSI.

In one sub-embodiment of the above embodiment, a measurement(s) on the third radio signal includes an interference measurement, the interference measurement is used for generating the CSI.

In one sub-embodiment of the above embodiment, measurements on the third radio signal include a channel measurement and an interference measurement, the channel measurement and the interference measurement are used for generating the CSI.

In one embodiment, the third information is semi-statically configured.

In one embodiment, the third information is carried by a higher layer signaling.

In one embodiment, the third information is carried by an RRC signaling.

In one embodiment, the third information comprises one or more IEs of an RRC signaling.

In one embodiment, the third information comprises all or part of an IE of an RRC signaling.

In one embodiment, the third information comprises multiple IEs of an RRC signaling.

In one embodiment, the third information explicitly indicate N time-frequency resource sets.

In one embodiment, the third information implicitly indicate N time-frequency resource sets.

In one embodiment, each time-frequency resource set of the N time-frequency resource sets comprises a positive integer number of time-frequency resource(s), the third information comprises configuration information of each time-frequency resource in the N time-frequency resource sets.

In one embodiment, a given time-frequency resource set is a time-frequency resource set of the N time-frequency resource sets, the given time-frequency resource set comprises a positive integer number of time-frequency resource(s); a given time-frequency resource is a time-frequency resource in the target time-frequency resource set.

In one sub-embodiment of the above embodiment, configuration information of the given time-frequency resource comprises at least one of time domain resource occupied, code domain resource occupied, frequency domain resource occupied and a corresponding antenna port set.

In one sub-embodiment of the above embodiment, configuration information of the given time-frequency resource comprises time domain resource occupied, code domain resource occupied, frequency domain resource occupied and a corresponding antenna port set.

In one sub-embodiment of the above embodiment, configuration information of the given time-frequency resource comprises an initial multicarrier symbol occupied, a number of multicarrier symbols occupied, an initial Physical Resource Block (PRB) before or without frequency hopping, an initial PRB after frequency hopping, a number of PRBs occupied, setting of frequency hopping, Cyclic Shift (CS), OCC, OCC length, a corresponding antenna port set and a maximum code rate.

In one sub-embodiment of the above embodiment, configuration information of the given time-frequency resource comprises at least one of an initial multicarrier symbol occupied, a number of multicarrier symbols occupied, an initial Physical Resource Block (PRB) before or without frequency hopping, an initial PRB after frequency hopping, a number of PRBs occupied, setting of frequency hopping, Cyclic Shift (CS), OCC, OCC length, a corresponding antenna port set and a maximum code rate.

In one embodiment, the N time-frequency resource sets are N PUCCH resource sets respectively, the specific meaning of the PUCCH resource sets can be found in 3GPP TS38.213, chapter 9.2.1.

In one embodiment, the N time-frequency resource sets respectively correspond to N payload ranges.

In one embodiment, the N time-frequency resource sets respectively correspond to N bit number ranges.

In one sub-embodiment of the above embodiment, N is equal to 4, N bit number ranges are [1, 2], (2, N2], (N2, N3] and (N3, 1706] respectively, N2 and N3 are configured by a higher signaling(s).

In one sub-embodiment of the above embodiment, N is equal to 4, N bit number ranges are [1, 2], (2, N2], (N2, N3] and [N3, 1706] respectively, N2 and N3 are configured by a higher signaling(s).

Embodiment 6

Figure 6:
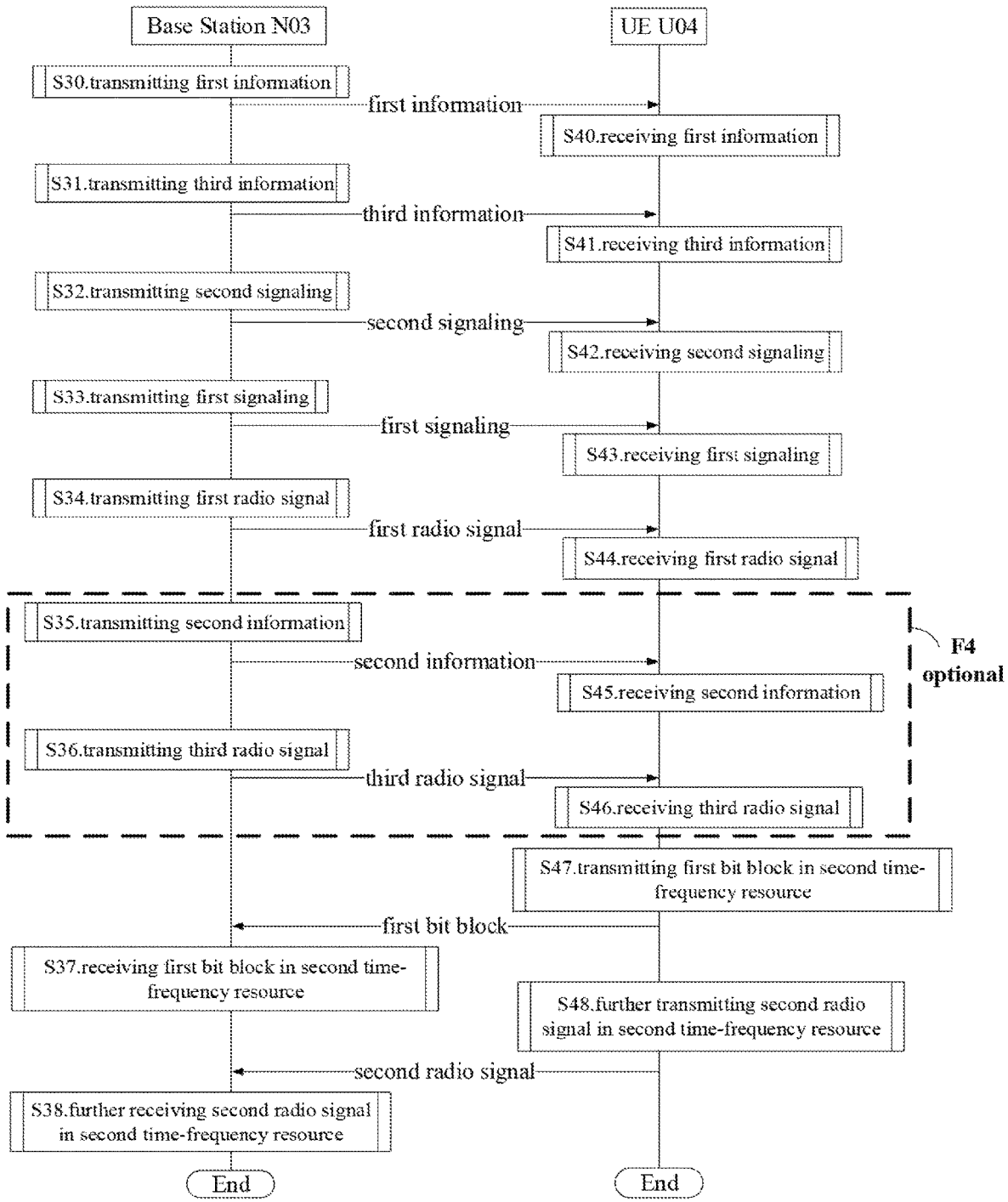
FIG. 6 illustrates another flowchart of wireless transmission according to another embodiment of the present disclosure.

Embodiment 6 illustrates a flowchart of wireless transmission, as shown in FIG. 6. In FIG. 6, a base station N03 is maintenance base station for a serving cell of a UE U04. In FIG. 6, the box F4 is optional.

The N03 transmits first information in step S30; transmits third information in step S31; transmits a second signaling in step S32; transmits a first signaling in step S33; transmits a first radio signal in step S34; transmits second information in step S35; transmits a third radio signal in step S36; receives a first bit block in a second time-frequency resource in step S37; and also receives a second radio signal in a second time-frequency resource in step S38.

The U04 receives first information in step S40; receives third information in step S41; receives a second signaling in step S42; receives a first signaling in step S43; receives a first radio signal in step S44; receives second information in step S45; receives a third radio signal in step S46; transmits a first bit block in a second time-frequency resource in step S47; and also transmits a second radio signal in a second time-frequency resource in step S48.

In one embodiment, if the first bit block is transmitted in the second time-frequency resource, then a second radio signal is also transmitted in the second time-frequency resource; if the first bit block is transmitted in the first time-frequency resource, then a transmission of a second radio signal is dropped in the second time-frequency resource.

In one embodiment, if the first bit block is transmitted in the second time-frequency resource, then a second radio signal is also transmitted in the second time-frequency resource; if the first bit block is transmitted in the first time-frequency resource, then a first sub-signal is also transmitted in the second time-frequency resource, and transmission of a second sub-signal in the second time-frequency resource is dropped.

In one embodiment, if the first bit block is transmitted in the second time-frequency resource, then a second radio signal is also transmitted in the second time-frequency resource.

Embodiment 7

Figure 7:
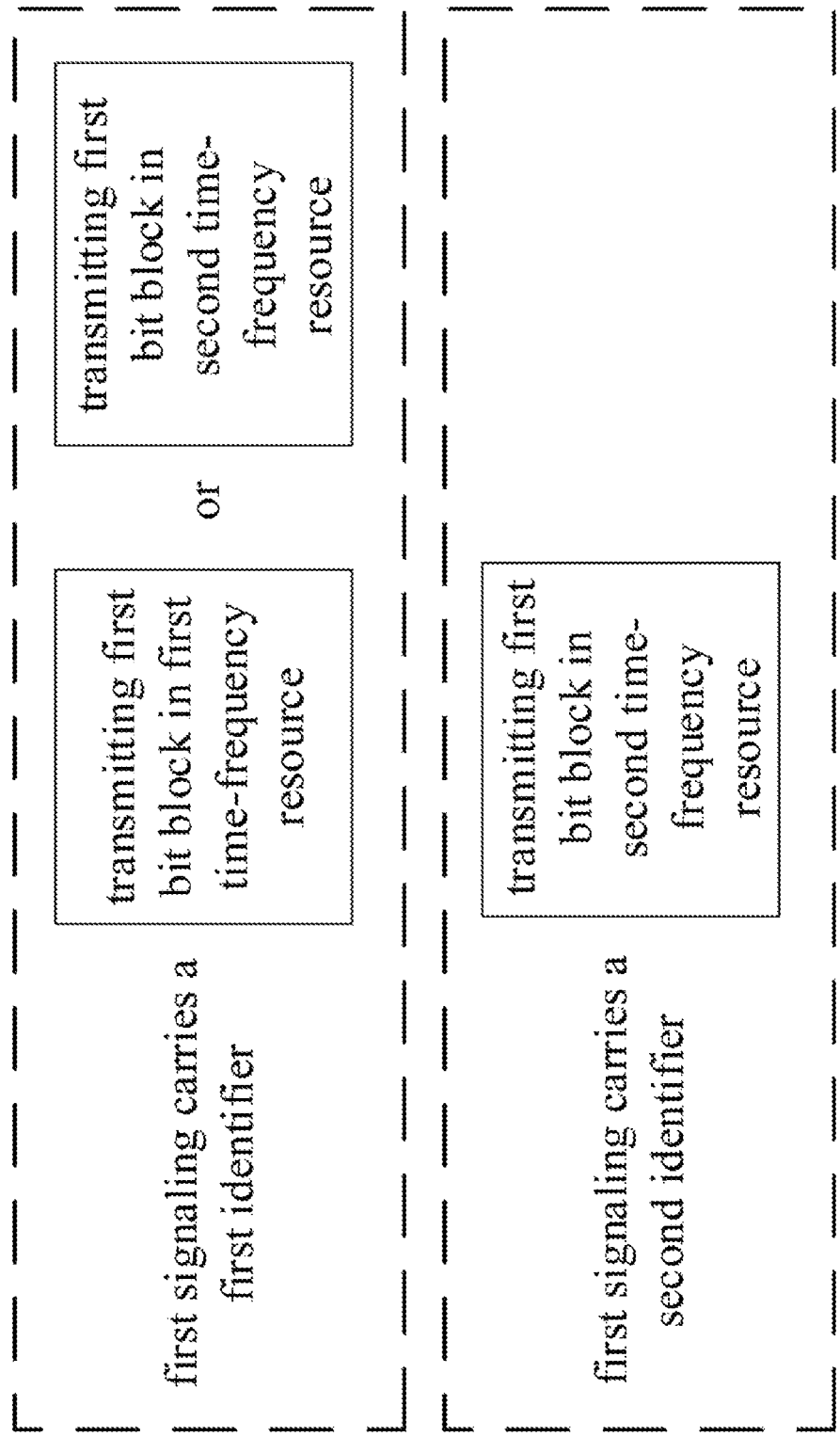
FIG. 7 illustrates a schematic diagram of determining whether a first bit block is transmitted in a first time-frequency resource or in a second time-frequency resource based on whether a first signaling carries a first identifier or a second identifier according to one embodiment of the present disclosure.

Embodiment 7 illustrates a schematic diagram of determining whether a first bit block is transmitted in a first time-frequency resource or in a second time-frequency resource based on whether a first signaling carries a first identifier or a second identifier, as shown in FIG. 7.

In Embodiment 7, if the first signaling carries the first identifier, then the first bit block is transmitted in the first time-frequency resource or the first bit block is transmitted in the second time-frequency resource; if the first signaling carries the second identifier, then the first bit block is only transmitted in the second time-frequency resource between the first time-frequency resource and the second time-frequency resource.

In one embodiment, the first signaling carries the first identifier; a first bit block is transmitted in the first time-frequency resource, or, a first bit block is transmitted in the second time-frequency resource.

In one sub-embodiment of the above embodiment, a first bit block is transmitted in the first time-frequency resource.

In one sub-embodiment of the above embodiment, a first bit block is transmitted in the second time-frequency resource.

Embodiment 8

Figure 8:
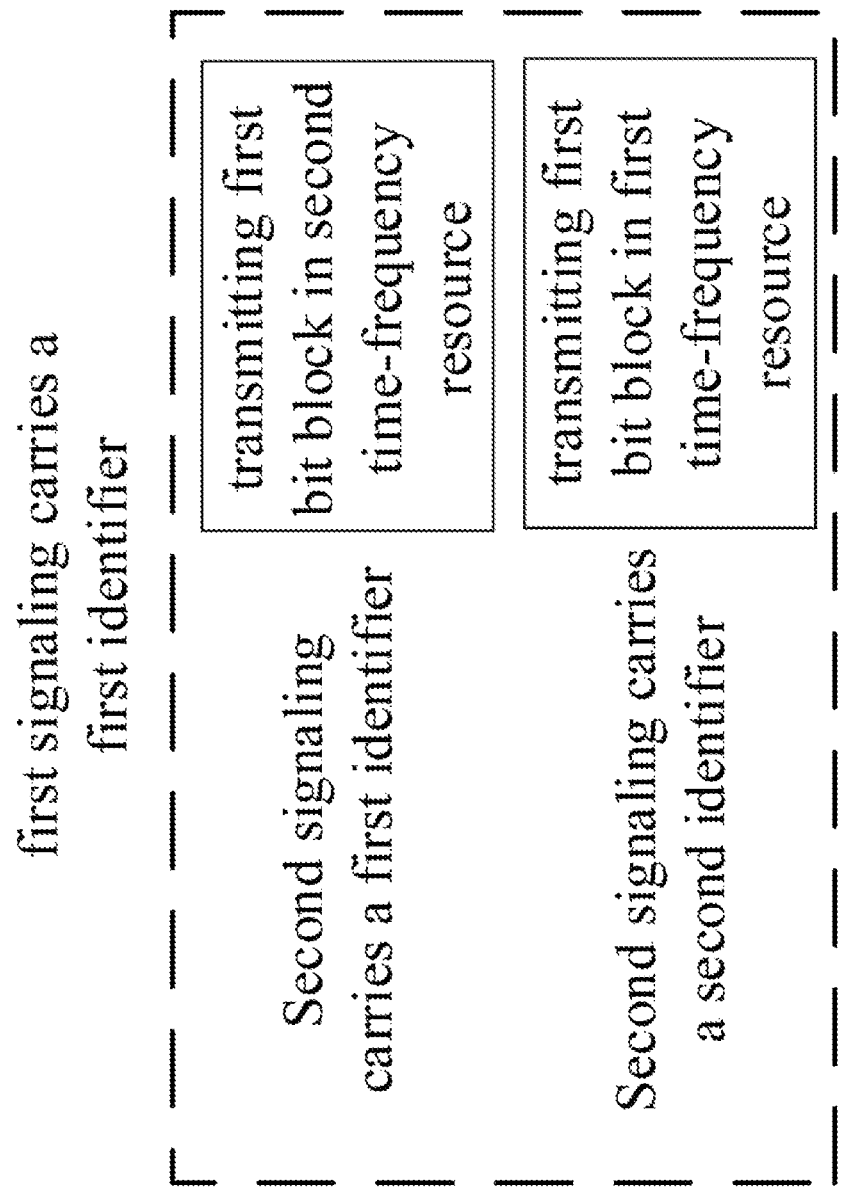
FIG. 8 illustrates a schematic diagram of determining whether a first bit block is transmitted in a first time-frequency resource or in a second time-frequency resource according to one embodiment of the present disclosure.

Embodiment 8 illustrates a schematic diagram of determining whether a first bit block is transmitted in a first time-frequency resource or in a second time-frequency resource, as shown in FIG. 8.

In Embodiment 8, the first signaling in the present disclosure carries the first identifier, the second signaling in the present disclosure carries the first identifier or the second identifier, whether the second signaling carries the first identifier or the second identifier is used for determining whether the first bit block is transmitted in the first time-frequency resource or is transmitted in the second time-frequency resource.

In one embodiment, if the second signaling carries the first identifier, the first bit block is transmitted in the second time-frequency resource.

In one embodiment, if the second signaling carries the second identifier, the first bit block is transmitted in the first time-frequency resource.

Embodiment 9

Figure 9:
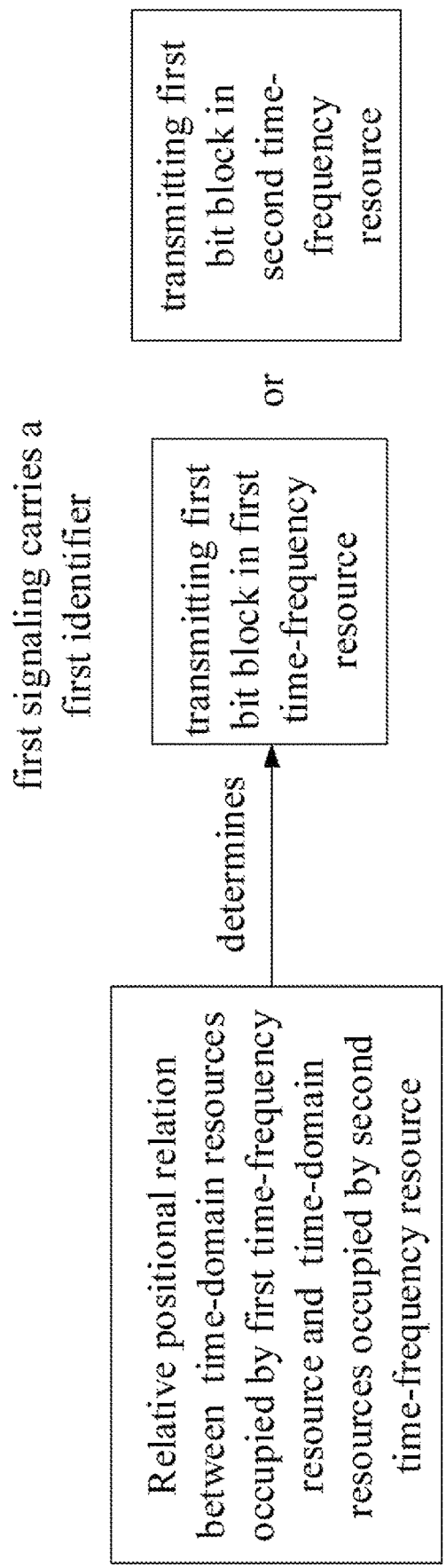
FIG. 9 illustrates a schematic diagram of determining whether a first bit block is transmitted in a first time-frequency resource or in a second time-frequency resource according to another embodiment of the present disclosure.

Embodiment 9 illustrates another schematic diagram of determining whether a first bit block is transmitted in a first time-frequency resource or in a second time-frequency resource, as shown in FIG. 9.

In Embodiment 9, the first signaling in the present disclosure carries the first identifier in the present disclosure, a relative positional relation between time domain resource occupied by the first time-frequency resource and time domain resource occupied by the second time-frequency resource is used for determining whether the first bit block is transmitted in the first time-frequency resource or is transmitted in the second time-frequency resource.

In one embodiment, if time domain resource occupied by the second time-frequency resource comprises time domain resource occupied by the first time-frequency resource, the first bit block is transmitted in the second time-frequency resource; if time domain resource occupied by the first time-frequency resource comprises time domain resource not belonging to time domain resource occupied by the second time-frequency resource, the first bit block is transmitted in the first time-frequency resource.

In one embodiment, if time domain resource occupied by the second time-frequency resource comprises time domain resource occupied by the first time-frequency resource, the first bit block is transmitted in the second time-frequency resource; if at least one multicarrier symbol in time domain resource occupied by the first time-frequency resource does not belong to the time domain resource occupied by the second time-frequency resource, the first bit block is transmitted in the first time-frequency resource.

In one embodiment, if time domain resource occupied by the second time-frequency resource comprises time domain resource occupied by the first time-frequency resource, the first bit block is transmitted in the second time-frequency resource; if at least one multicarrier symbol in the time domain resource occupied by the first time-frequency resource does not belong to the time domain resource occupied by the second time-frequency resource, the first bit block is transmitted in the first time-frequency resource or the second time-frequency resource.

In one sub-embodiment of the above embodiment, if a number of multicarrier symbols in the time domain resource occupied by the first time-frequency resource that belong to the time domain resource occupied by the second time-frequency resource is less than a first threshold, the first bit block is transmitted in the first time-frequency resource; if a number of multicarrier symbols in the time domain resource occupied by the first time-frequency resource that belong to the time domain resource occupied by the second time-frequency resource is greater than the first threshold, the first bit block is transmitted in the second time-frequency resource; if a number of multicarrier symbols in the time domain resource occupied by the first time-frequency resource that belong to the time domain resource occupied by the second time-frequency resource is equal to the first threshold, the first bit block is transmitted in the first time-frequency resource or in the second time-frequency resource; the first threshold is a positive integer, the first threshold is pre-defined or configurable.

In one sub-embodiment of the above embodiment, if a ratio of a number of multicarrier symbols in time domain resource occupied by the first time-frequency resource that belong to time domain resource occupied by the second time-frequency resource to a number of multicarrier symbols occupied by the first time-frequency resource is less than a second threshold, the first bit block is transmitted in the first time-frequency resource; if a ratio of a number of multicarrier symbols in the time domain resource occupied by the first time-frequency resource that belong to the time domain resource occupied by the second time-frequency resource to a number of multicarrier symbols occupied by the first time-frequency resource is greater than the second threshold, the first bit block is transmitted in the second time-frequency resource; if a ratio of a number of multicarrier symbols in the time domain resource occupied by the first time-frequency resource that belong to the time domain resource occupied by the second time-frequency resource to a number of multicarrier symbols occupied by the first time-frequency resource is equal to the second threshold, the first bit block is transmitted in the first time-frequency resource or the second time-frequency resource; the second threshold is a positive real number not greater than 1, the second threshold is pre-defined or configurable.

In one sub-embodiment of the above embodiment, if a ratio of a number of multicarrier symbols in time domain resource occupied by the first time-frequency resource that belong to time domain resource occupied by the second time-frequency resource to a number of multicarrier symbols occupied by the second time-frequency resource is less than a third threshold, the first bit block is transmitted in the first time-frequency resource; if a ratio of a number of multicarrier symbols in the time domain resource occupied by the first time-frequency resource that belong to the time domain resource occupied by the second time-frequency resource to a number of multicarrier symbols occupied by the second time-frequency resource is greater than the third threshold, the first bit block is transmitted in the second time-frequency resource; if a ratio of a number of multicarrier symbols in the time domain resource occupied by the first time-frequency resource that belong to the time domain resource occupied by the second time-frequency resource to a number of multicarrier symbols occupied by the second time-frequency resource is equal to the third threshold, the first bit block is transmitted in the first time-frequency resource or the second time-frequency resource; the third threshold is a positive real number not greater than 1, the third threshold is pre-defined or configurable.

In one sub-embodiment of the above embodiment, if a difference between a number of multicarrier symbols occupied by the first time-frequency resource and a number of multicarrier symbols in time domain resource occupied by the first time-frequency resource that belong to time domain resource occupied by the second time-frequency resource is less than a fourth threshold, the first bit block is transmitted in the second time-frequency resource; if a difference between a number of multicarrier symbols occupied by the first time-frequency resource and a number of multicarrier symbols in the time domain resource occupied by the first time-frequency resource that belong to the time domain resource occupied by the second time-frequency resource is greater than the fourth threshold, the first bit block is transmitted in the first time-frequency resource; if a difference between a number of multicarrier symbols occupied by the first time-frequency resource and a number of multicarrier symbols in the time domain resource occupied by the first time-frequency resource that belong to the time domain resource occupied by the second time-frequency resource is equal to the fourth threshold, the first bit block is transmitted in the first time-frequency resource or the second time-frequency resource; the fourth threshold is a positive integer, the fourth threshold is pre-defined or configurable.

In one sub-embodiment of the above embodiment, if a difference between a number of multicarrier symbols occupied by the second time-frequency resource and a number of multicarrier symbols in time domain resource occupied by the first time-frequency resource that belong to time domain resource occupied by the second time-frequency resource is less than a fifth threshold, the first bit block is transmitted in the second time-frequency resource; if a difference between a number of multicarrier symbols occupied by the second time-frequency resource and a number of multicarrier symbols in the time domain resource occupied by the first time-frequency resource that belong to the time domain resource occupied by the second time-frequency resource is greater than the fifth threshold, the first bit block is transmitted in the first time-frequency resource; if a difference between a number of multicarrier symbols occupied by the second time-frequency resource and a number of multicarrier symbols in the time domain resource occupied by the first time-frequency resource that belong to the time domain resource occupied by the second time-frequency resource is equal to the fifth threshold, the first bit block is transmitted in the first time-frequency resource or the second time-frequency resource; the fifth threshold is a positive integer, the fifth threshold is pre-defined or configurable.

Embodiment 10

Figure 10:
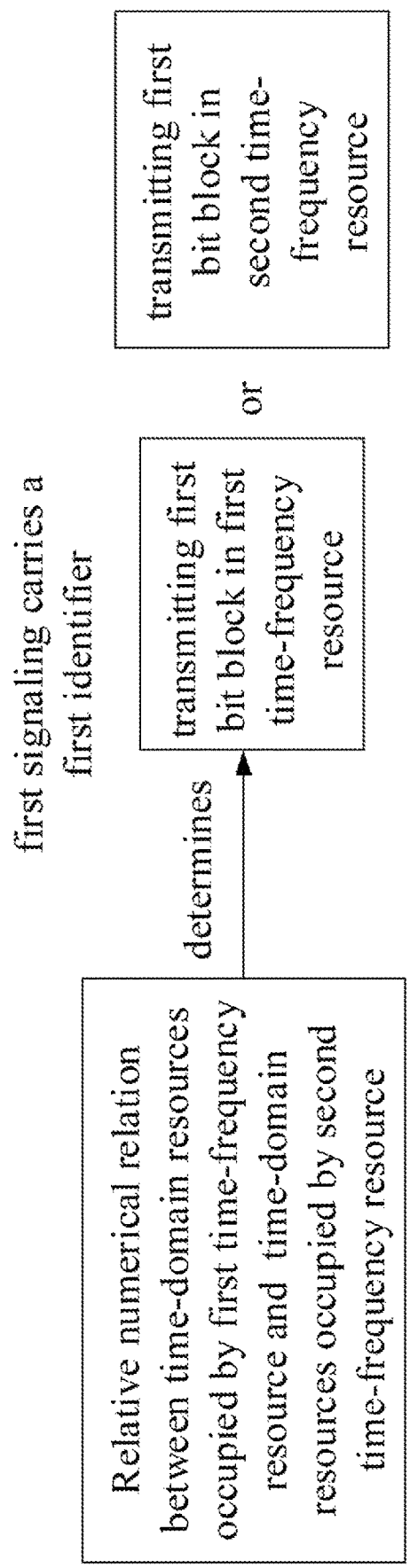
FIG. 10 illustrates a schematic diagram of determining whether a first bit block is transmitted in a first time-frequency resource or in a second time-frequency resource according to another embodiment of the present disclosure.

Embodiment 10 illustrates another schematic diagram of determining whether a first bit block is transmitted in a first time-frequency resource or in a second time-frequency resource, as shown in FIG. 10.

In Embodiment 10, the first signaling in the present disclosure carries the first identifier in the present disclosure, a relative numerical relation between time domain resource occupied by the first time-frequency resource and time domain resource occupied by the second time-frequency resource is used for determining whether the first bit block is transmitted in the first time-frequency resource or is transmitted in the second time-frequency resource.

In one embodiment, if a number of multicarrier symbols occupied by the second time-frequency resource is greater than a number of multicarrier symbols occupied by the first time-frequency resource, the first bit block is transmitted in the second time-frequency resource; if a number of multicarrier symbols occupied by the second time-frequency resource is less than a number of multicarrier symbols occupied by the first time-frequency resource, the first bit block is transmitted in the first time-frequency resource.

In one sub-embodiment of the above embodiment, if a number of multicarrier symbols occupied by the second time-frequency resource is equal to a number of multicarrier symbols occupied by the first time-frequency resource, the first bit block is transmitted in the second time-frequency resource.

In one sub-embodiment of the above embodiment, if a number of multicarrier symbols occupied by the second time-frequency resource is equal to a number of multicarrier symbols occupied by the first time-frequency resource, the first bit block is transmitted in the first time-frequency resource.

In one embodiment, if a ratio of a number of multicarrier symbols occupied by the second time-frequency resource to a number of multicarrier symbols occupied by the first time-frequency resource is greater than a sixth threshold, the first bit block is transmitted in the second time-frequency resource; if a ratio of a number of multicarrier symbols occupied by the second time-frequency resource to a number of multicarrier symbols occupied by the first time-frequency resource is less than a sixth threshold, the first bit block is transmitted in the first time-frequency resource.

In one sub-embodiment of the above embodiment, the ratio of a number of multicarrier symbols occupied by the second time-frequency resource to a number of multicarrier symbols occupied by the first time-frequency resource is equal to a number of multicarrier symbols occupied by the second time-frequency resource divided by a number of multicarrier symbols occupied by the first time-frequency resource.

In one embodiment of the above embodiment, if a ratio of a number of multicarrier symbols occupied by the second time-frequency resource to a number of multicarrier symbols occupied by the first time-frequency resource is equal to the sixth threshold, the first bit block is transmitted in the second time-frequency resource.

In one sub-embodiment of the above embodiment, if a ratio of a number of multicarrier symbols occupied by the second time-frequency resource to a number of multicarrier symbols occupied by the first time-frequency resource is equal to the sixth threshold, the first bit block is transmitted in the first time-frequency resource.

In one sub-embodiment of the above embodiment, the sixth threshold is pre-defined.

In one sub-embodiment of the above embodiment, the sixth threshold is configurable.

In one sub-embodiment of the above embodiment, the sixth threshold is a positive real number.

In one sub-embodiment of the above embodiment, the sixth threshold is equal to 1.

In one sub-embodiment of the above embodiment, the sixth threshold is greater than 1.

In one embodiment, if a difference between a number of multicarrier symbols occupied by the second time-frequency resource and a number of multicarrier symbols occupied by the first time-frequency resource is greater than a seventh threshold, the first bit block is transmitted in the second time-frequency resource; if a difference between a number of multicarrier symbols occupied by the second time-frequency resource and a number of multicarrier symbols occupied by the first time-frequency resource is less than the seventh threshold, the first bit block is transmitted in the first time-frequency resource.

In one sub-embodiment of the above embodiment, the difference between a number of multicarrier symbols occupied by the second time-frequency resource and a number of multicarrier symbols occupied by the first time-frequency resource is equal to a number of multicarrier symbols occupied by the second time-frequency resource minus a number of multicarrier symbols occupied by the first time-frequency resource.

In one sub-embodiment of the above embodiment, if a difference between a number of multicarrier symbols occupied by the second time-frequency resource and a number of multicarrier symbols occupied by the first time-frequency resource is equal to the seventh threshold, the first bit block is transmitted in the second time-frequency resource.

In one sub-embodiment of the above embodiment, if a difference between a number of multicarrier symbols occupied by the second time-frequency resource and a number of multicarrier symbols occupied by the first time-frequency resource is equal to the seventh threshold, the first bit block is transmitted in the first time-frequency resource.

In one sub-embodiment of the above embodiment, the seventh threshold is pre-defined.

In one sub-embodiment of the above embodiment, the seventh threshold is configurable.

In one sub-embodiment of the above embodiment, the seventh threshold is a positive real number.

In one sub-embodiment of the above embodiment, the seventh threshold is equal to 0.

In one sub-embodiment of the above embodiment, the seventh threshold is greater than 0.

In one embodiment, if a ratio of a number of multicarrier symbols occupied by the first time-frequency resource to a number of multicarrier symbols occupied by the second time-frequency resource is greater than an eighth threshold, the first bit block is transmitted in the first time-frequency resource; if a ratio of a number of multicarrier symbols occupied by the first time-frequency resource to a number of multicarrier symbols occupied by the second time-frequency resource is less than the eighth threshold, the first bit block is transmitted in the second time-frequency resource.

In one sub-embodiment of the above embodiment, the ratio of a number of multicarrier symbols occupied by the first time-frequency resource to a number of multicarrier symbols occupied by the second time-frequency resource is equal to a number of multicarrier symbols occupied by the first time-frequency resource divided by a number of multicarrier symbols occupied by the second time-frequency resource.

In one sub-embodiment of the above embodiment, if a ratio of a number of multicarrier symbols occupied by the first time-frequency resource to a number of multicarrier symbols occupied by the second time-frequency resource is equal to the eighth threshold, the first bit block is transmitted in the second time-frequency resource.

In one sub-embodiment of the above embodiment, if a ratio of a number of multicarrier symbols occupied by the first time-frequency resource to a number of multicarrier symbols occupied by the second time-frequency resource is equal to an eighth threshold, the first bit block is transmitted in the first time-frequency resource.

In one sub-embodiment of the above embodiment, the eighth threshold is pre-defined.

In one sub-embodiment of the above embodiment, the eighth threshold is configurable.

In one sub-embodiment of the above embodiment, the eighth threshold is a positive real number.

In one sub-embodiment of the above embodiment, the eighth threshold is equal to 1.

In one sub-embodiment of the above embodiment, the eighth threshold is greater than 1.

In one sub-embodiment of the above embodiment, the eighth threshold is less than 1.

In one embodiment, if a difference between a number of multicarrier symbols occupied by the first time-frequency resource and a number of multicarrier symbols occupied by the second time-frequency resource is greater than a ninth threshold, the first bit block is transmitted in the first time-frequency resource; if a difference between a number of multicarrier symbols occupied by the first time-frequency resource and a number of multicarrier symbols occupied by the second time-frequency resource is less than the ninth threshold, the first bit block is transmitted in the second time-frequency resource.

In one sub-embodiment of the above embodiment, the difference between a number of multicarrier symbols occupied by the first time-frequency resource and a number of multicarrier symbols occupied by the second time-frequency resource is equal to a number of multicarrier symbols occupied by the first time-frequency resource minus a number of multicarrier symbols occupied by the second time-frequency resource.

In one sub-embodiment of the above embodiment, if a difference between a number of multicarrier symbols occupied by the first time-frequency resource and a number of multicarrier symbols occupied by the second time-frequency resource is equal to the ninth threshold, the first bit block is transmitted in the second time-frequency resource.

In one sub-embodiment of the above embodiment, if a difference between a number of multicarrier symbols occupied by the first time-frequency resource and a number of multicarrier symbols occupied by the second time-frequency resource is equal to a ninth threshold, the first bit block is transmitted in the first time-frequency resource.

In one sub-embodiment of the above embodiment, the ninth threshold is pre-defined.

In one sub-embodiment of the above embodiment, the ninth threshold is configurable.

In one sub-embodiment of the above embodiment, the ninth threshold is a positive real number.

In one sub-embodiment of the above embodiment, the ninth threshold is equal to 0.

In one sub-embodiment of the above embodiment, the ninth threshold is greater than 0.

In one sub-embodiment of the above embodiment, the ninth threshold is less than 0.

Embodiment 11

Figure 11:
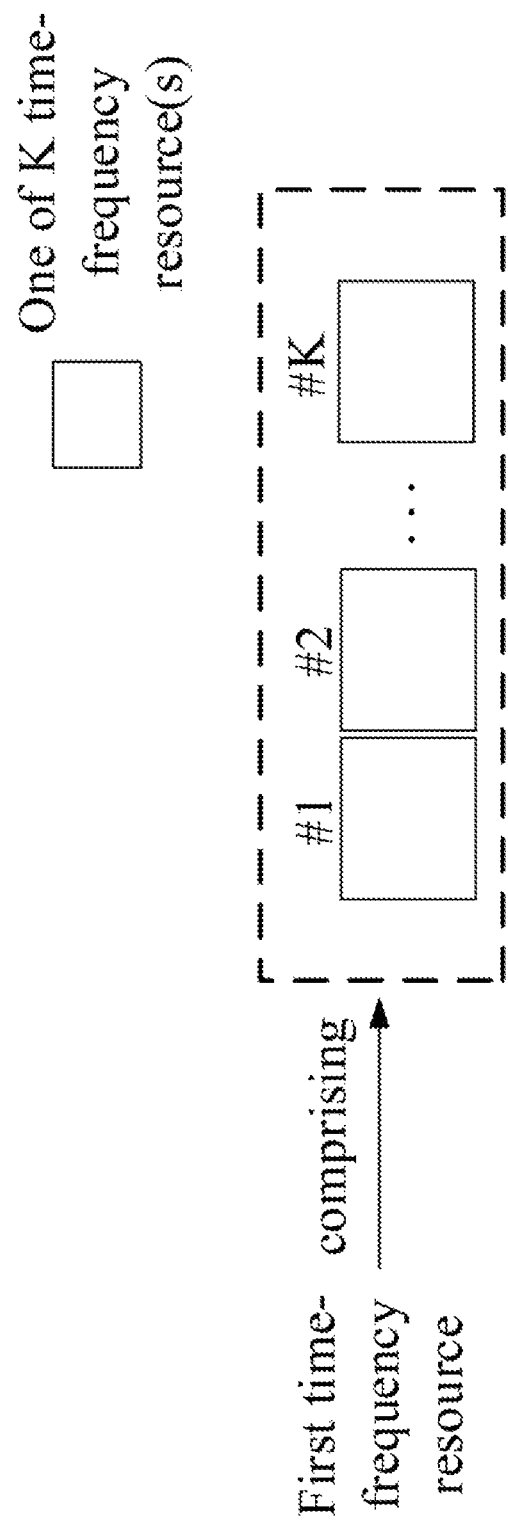
FIG. 11 illustrates a schematic diagram of a first time-frequency resource according to one embodiment of the present disclosure.

Embodiment 11 illustrates a schematic diagram of a first time-frequency resource, as shown in FIG. 11.

In Embodiment 11, the first time-frequency resource comprises K time-frequency resource(s), K is a positive integer.

In one embodiment, K is equal to 1.

In one embodiment, K is greater than 1, any two time-frequency resources in the K time-frequency resources are orthogonal.

In one sub-embodiment of the above embodiment, each of the K time-frequency resources comprises a same subcarrier(s) in frequency domain.

In one sub-embodiment of the above embodiment, each of the K time-frequency resources comprises a same number of subcarrier(s) in frequency domain.

In one sub-embodiment of the above embodiment, each of the K time-frequency resources comprises a same number of multicarrier symbol(s) in time domain.

In one sub-embodiment of the above embodiment, the K time-frequency resources are consecutive in time domain.

In one sub-embodiment of the above embodiment, at least two time-frequency resources of the K time-frequency resources are non-consecutive in time domain.

In one embodiment, K is pre-defined.

In one embodiment, K is configurable.

In one embodiment, the first signaling is used for indicating K.

In one embodiment, the first signaling comprises a third field, the third field comprised in the first signaling is used for indicating K.

In one sub-embodiment of the above embodiment, the third field comprised in the first signaling comprises a positive integer number of bit(s).

In one sub-embodiment of the above embodiment, the third field comprised in the first signaling indicates an index of K in multiple positive integers.

In one embodiment, the above method further comprises:
receiving fourth information;
herein, the fourth information is used for indicating K.

In one sub-embodiment, the fourth information is semi-statically configured.

In one sub-embodiment, the fourth information is carried by a higher layer signaling.

In one sub-embodiment, the fourth information is carried by an RRC signaling.

In one sub-embodiment, the fourth information is carried by a MAC CE signaling.

In one sub-embodiment, the fourth information comprises one or more IEs of an RRC signaling.

In one sub-embodiment, the fourth information comprises all or part of an IE of an RRC signaling.

In one sub-embodiment, the fourth information comprises multiple IEs of an RRC signaling.

Embodiment 12

Figure 12:
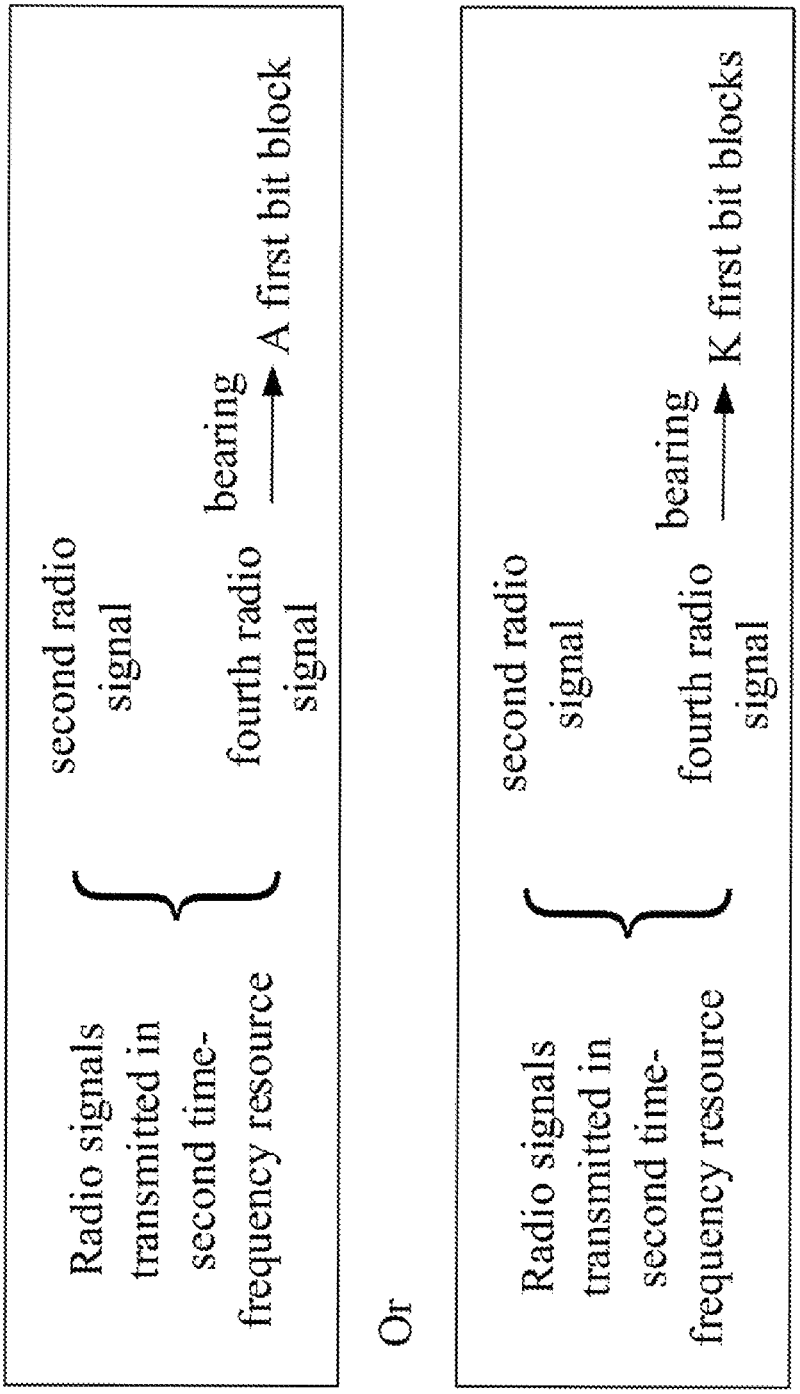
FIG. 12 illustrates a schematic diagram of transmitting a first bit block(s) in a second time-frequency resource according to one embodiment of the present disclosure.

Embodiment 12 illustrates a schematic diagram of transmitting a first bit block(s) in a second time-frequency resource, as shown in FIG. 12.

In Embodiment 12, the first bit block is used for indicating whether the first radio signal is correctly received; if the first bit block is transmitted in the second time-frequency resource, radio signals transmitted in the second time-frequency resource comprise the second radio signal and a fourth radio signal in the present disclosure, the first bit block is carried by the fourth radio signal.

In one embodiment, if the first bit block is transmitted in the second time-frequency resource, the transmission of the first bit block in the first time-frequency resource is dropped.

In one embodiment, if the first bit block is transmitted in the second time-frequency resource, the UE drops transmitting radio signals in the first time-frequency resource.

In one embodiment, a number of the first bit block(s) carried by the fourth radio signal is equal to 1.

In one embodiment, a number of the first bit blocks carried by the fourth radio signal is greater than 1.

In one sub-embodiment of the above embodiment, the number of the first bit blocks transmitted in the fourth radio signal is equal to K in the present disclosure, K is pre-defined or configurable.

In one embodiment, the first time-frequency resource comprises K time-frequency resources, any two time-frequency resources of the K time-frequency resources are orthogonal, K is a positive integer greater than 1; the number of the first bit blocks carried by the fourth radio signal is equal to K; K is pre-defined or configurable.

Embodiment 13

Figure 13:
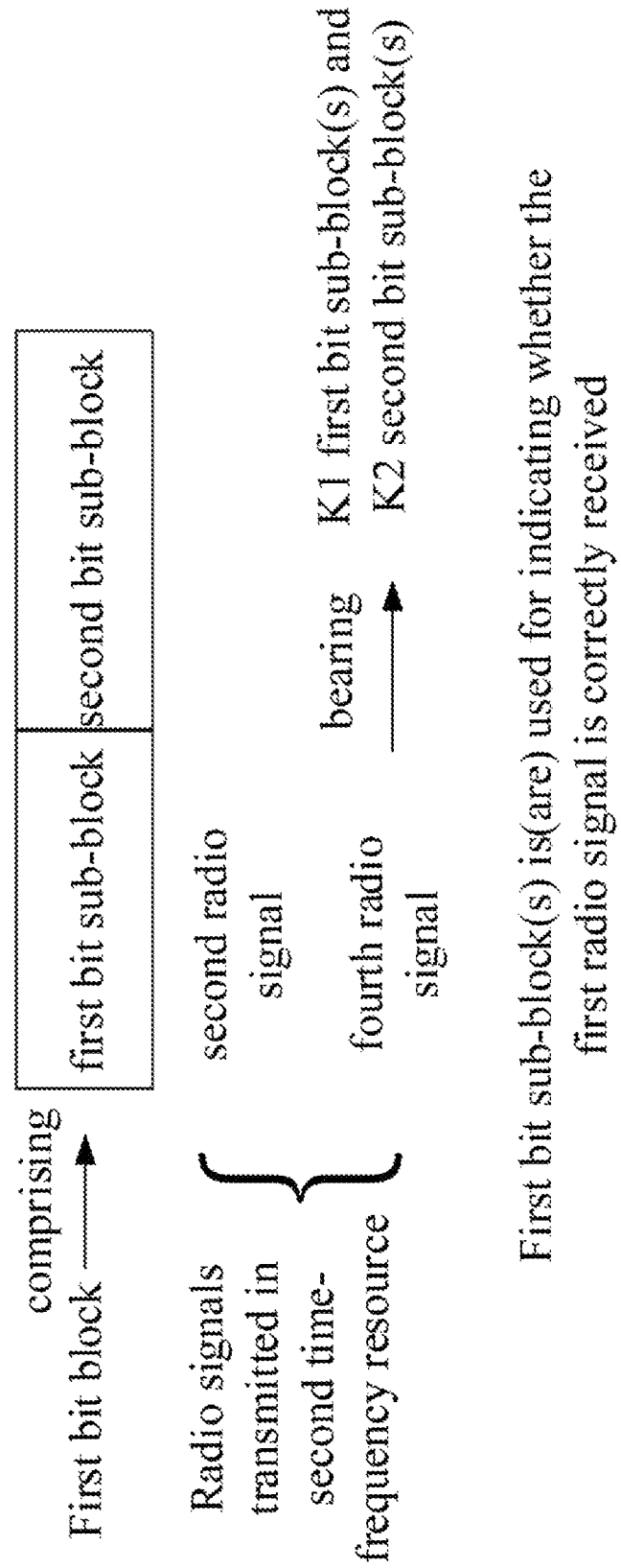
FIG. 13 illustrates a schematic diagram of transmitting a first bit block(s) in a second time-frequency resource according to another embodiment of the present disclosure.

Embodiment 13 illustrates another schematic diagram of transmitting a first bit block(s) in a second time-frequency resource, as shown in FIG. 13.

In Embodiment 13, if the first bit block(s) is(are) transmitted in the second time-frequency resource, radio signals transmitted in the second time-frequency resource comprises the second radio signal and a fourth radio signal in the present disclosure, the first bit block(s) is(are) carried by the fourth radio signal; the first bit block(s) comprises(comprise) first bit sub-block(s) and second bit sub-block(s), the first bit sub-block(s) is(are) used for indicating whether the first radio signal is correctly received, the second bit sub-block(s) is(are) acquired based on a measurement on the third radio signal in the present disclosure.

In one embodiment, if the first bit block(s) is(are) transmitted in the second time-frequency resource, then transmission of the first bit block(s) in the first time-frequency resource is dropped.

In one embodiment, if the first bit block(s) is(are) transmitted in the second time-frequency resource, the UE drops transmitting radio signals in the first time-frequency resource.

In one embodiment, a number of the first bit sub-block(s) carried by the fourth radio signal is equal to K1, a number of the second bit sub-block(s) carried by the fourth radio signal is equal to K2; K1 is a positive integer, K2 is a positive integer.

In one sub-embodiment of the above embodiment, K1 is equal to 1, K2 is equal to 1.

In one sub-embodiment of the above embodiment, K1 is greater than 1, K2 is equal to 1.

In one sub-embodiment of the above embodiment, K1 is greater than 1, K2 is greater than 1.

In one sub-embodiment of the above embodiment, K1 is equal to K, K2 is equal to 1, K is pre-defined or configurable.

In one sub-embodiment of the above embodiment, K1 is equal to K, K2 is equal to K, K is pre-defined or configurable.

In one sub-embodiment of the above embodiment, the first signaling carries the first identifier.

In one sub-embodiment of the above embodiment, K2 is equal to 1, second information is used for indicating configuration information of the third radio signal, a signaling bearing the second information carries the first identifier or the second identifier.

In one embodiment, K2 is greater than 1, second information is used for indicating configuration information of the third radio signal, a signaling bearing the second information carries the first identifier.

Embodiment 14

Figure 14:
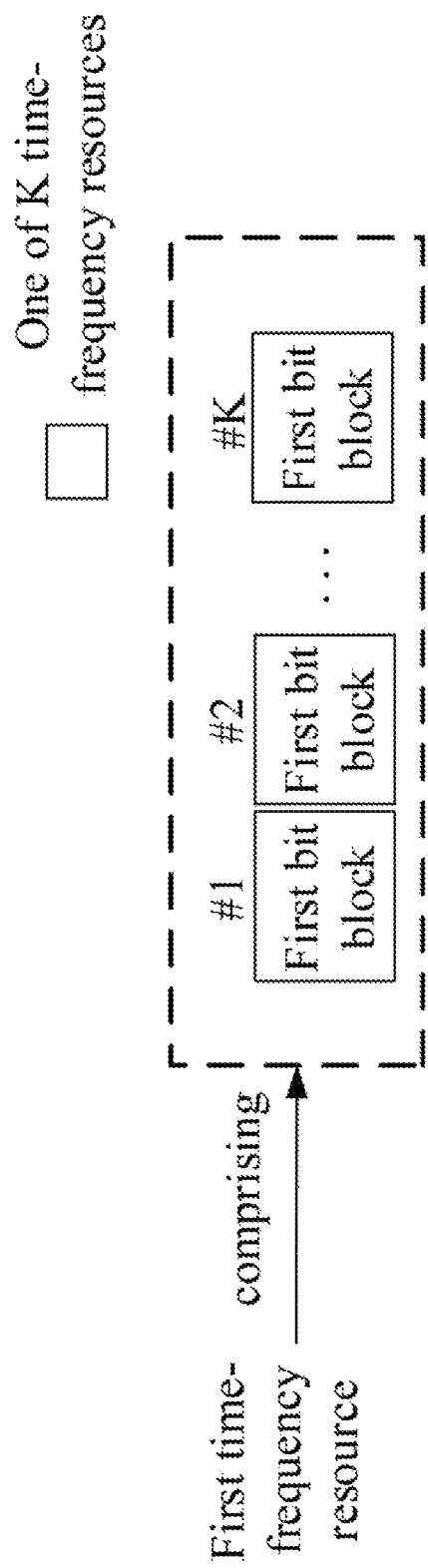
FIG. 14 illustrates a schematic diagram of transmitting a first bit block in a first time-frequency resource according to one embodiment of the present disclosure.

Embodiment 14 illustrates a schematic diagram of transmitting a first bit block in a first time-frequency resource, as shown in FIG. 14.

In Embodiment 14, the first bit block is used for indicating whether the first radio signal in the present disclosure is correctly received; the first bit block is transmitted in the first time-frequency resource, the first time-frequency resource comprises K time-frequency resources, any two time-frequency resources of the K time-frequency resources are orthogonal, K is a positive integer; the first bit block is transmitted in each time-frequency resource of the K time-frequency resources.

Embodiment 15

Figure 15:
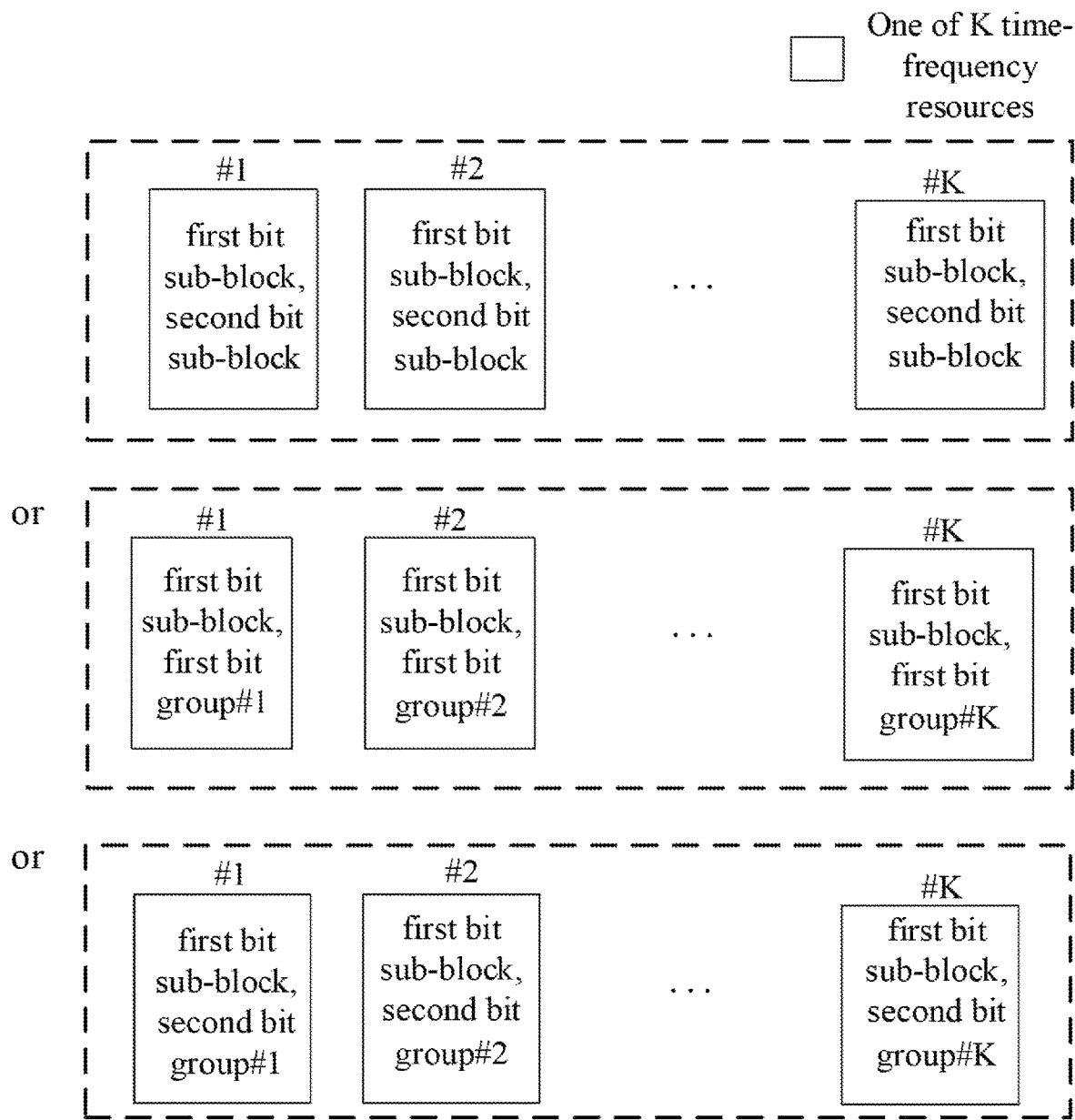
FIG. 15 illustrates a schematic diagram of transmitting a first bit block in a first time-frequency resource according to another embodiment of the present disclosure.

Embodiment 15 illustrates another schematic diagram of transmitting a first bit block in a first time-frequency resource, as shown in FIG. 15.

In Embodiment 15, the first bit block is transmitted in the first time-frequency resource, the first time-frequency resource comprises K time-frequency resources, any two time-frequency resources of the K time-frequency resources are orthogonal, K is a positive integer greater than 1; the first bit block comprises a first bit sub-block and a second bit sub-block; the first bit sub-block is used for indicating whether the first radio signal is correctly received; the first bit sub-block is transmitted in each time-frequency resource of the K time-frequency resources; the second bit sub-block is transmitted in each time-frequency resource of the K time-frequency resources, or, at least one bit in the second bit sub-block is transmitted in only one time-frequency resource of the K time-frequency resources.

In one embodiment, the second bit sub-block is transmitted in each time-frequency resource of the K time-frequency resources.

In one sub-embodiment of the above embodiment, a signaling bearing the second information carries the first identifier or the second identifier.

In one embodiment, at least one bit in the second bit sub-block is transmitted in only one time-frequency resource of the K time-frequency resources.

In one sub-embodiment of the above embodiment, each bit in the second bit sub-block is transmitted in only one time-frequency resource of the K time-frequency resources, at least two bits in the second bit sub-block are transmitted in different time-frequency resources of the K time-frequency resources.

In one sub-embodiment of the above embodiment, at least one bit in the second bit sub-block is transmitted in only one time-frequency resource of the K time-frequency resources, at least one bit in the second bit sub-block is transmitted in multiple time-frequency resources of the K time-frequency resources.

In one sub-embodiment of the above embodiment, a signaling bearing the second information carries the second identifier.

In one embodiment, a number of bits comprised in the second bit sub-block is equal to m, the m is a positive integer; the m bits comprised in the second bit sub-block are evenly divided into K first bit groups, the K first bit groups respectively comprise the m bits in the second bit sub-block; any bit in the second bit sub-block belongs to only one bit group of the K first bit groups.

In one sub-embodiment of the above embodiment, a signaling bearing the second information carries the second identifier.

In one sub-embodiment of the above embodiment, the K first bit groups are transmitted respectively in the K time-frequency resources.

In one embodiment, the second bit sub-block comprises S0 bits, S0 is not a positive integral multiple of K; a target bit block comprises the second bit sub-block and a third bit block, the third bit block comprises t bits, t is related to S0 and K.

In one sub-embodiment of the above embodiment, a signaling bearing the second information carries the second identifier.

In one sub-embodiment of the above embodiment, t is a positive integer not greater than K.

In one sub-embodiment of the above embodiment, t is equal to $\lfloor S0/K \rfloor K - S0$.

In one sub-embodiment of the above embodiment, a number of bits comprised in the target bit block is n, n is a positive integer.

In one sub-embodiment of the above embodiment, a number of bits comprised in the target bit block is n, t is equal to a difference between n and S0, n is a positive integer.

In one sub-embodiment of the above embodiment, all the t bits are equal to 0.

In one sub-embodiment of the above embodiment, all the t bits belong to the second bit sub-block.

In one sub-embodiment of the above embodiment, the t bits are the first t bits in the second bit sub-block, t is a positive integer.

In one sub-embodiment of the above embodiment, the t bits are t bits in the second bit sub-block, t is a positive integer.

In one sub-embodiment of the above embodiment, a number of bits comprised in the target bit block is equal to n, n is a positive integer; the n bits comprised in the target bit block are evenly divided into K second bit groups, the K second bit groups respectively comprise the n bits in the target bit block; any bit in the target bit block belongs to only one second bit group of the K second bit groups; the K second bit groups are transmitted respectively in the K time-frequency resources.

Embodiment 16

Figure 16:
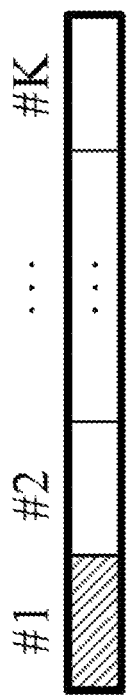
FIG. 16 illustrates a schematic diagram illustrating a first time-frequency resource associated with a first time-frequency resource set according to one embodiment of the present disclosure.
Figure 16:

Embodiment 16 illustrates a schematic diagram illustrating a first time-frequency resource associated with a first time-frequency resource set, as shown in FIG. 16.

In Embodiment 16, the first time-frequency resource set comprises a positive integer number of time-frequency resources, a first given time-frequency resource is a time-frequency in the first time-frequency resource set, the first time-frequency resource is related to the first given time-frequency resource.

In one embodiment, the first signaling in the present disclosure is used for indicating the first given time-frequency resource out of the positive integer number of time-frequency resources comprised in the first time-frequency resource set.

In one embodiment, the first time-frequency resource comprises K time-frequency resources, each of the K time-frequency resources comprises the same subcarrier(s) and the same number of multicarrier symbol(s) as the first given time-frequency resource.

In one embodiment, the first time-frequency resource comprises K time-frequency resources, the first given time-frequency resource is the same as an earliest time-frequency resource of the K time-frequency resources.

In one embodiment, the first time-frequency resource comprises K time-frequency resources, the first given time-frequency resource comprises the K time-frequency resources.

Embodiment 17

Figure 17:
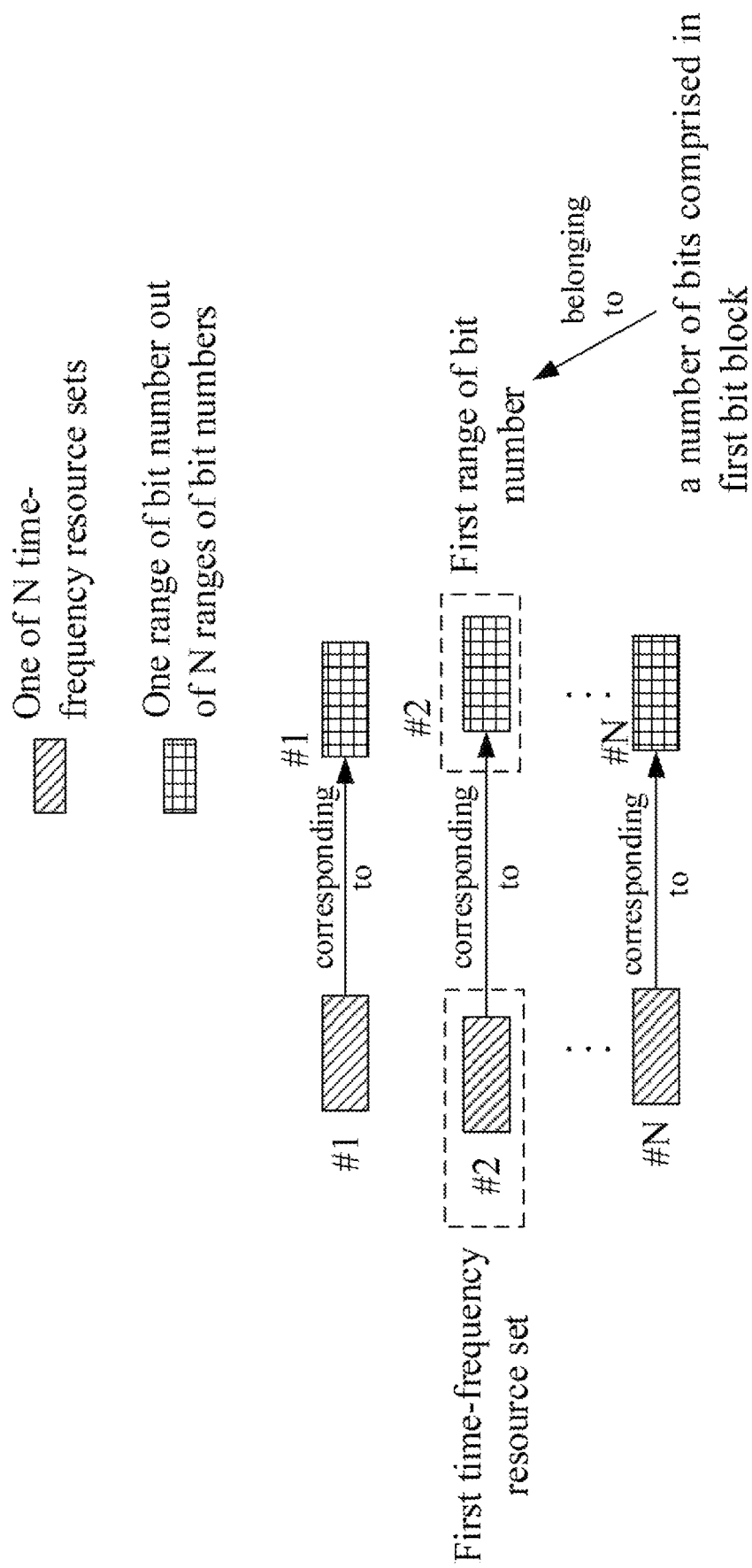
FIG. 17 illustrates a schematic diagram illustrating a number of bits comprised in a first bit block used for determining a first time-frequency resource set out of N time-frequency resource sets according to one embodiment of the present disclosure.

Embodiment 17 illustrates a schematic diagram illustrating a number of bits comprised in a first bit block used for determining a first time-frequency resource set out of N time-frequency resource sets, as shown in FIG. 17.

In Embodiment 17, the first bit block is used for indicating whether the first radio signal is correctly received; the N time-frequency resource sets respectively correspond to N bit number ranges, a number of bits comprised in the first bit block belongs to a first bit number range, the first bit number range is a bit number range of the N bit number ranges, the first time-frequency resource set is a time-frequency resource set of the N time-frequency resource sets corresponding to the first bit number range. N is a positive integer greater than 1.

Embodiment 18

Figure 18:
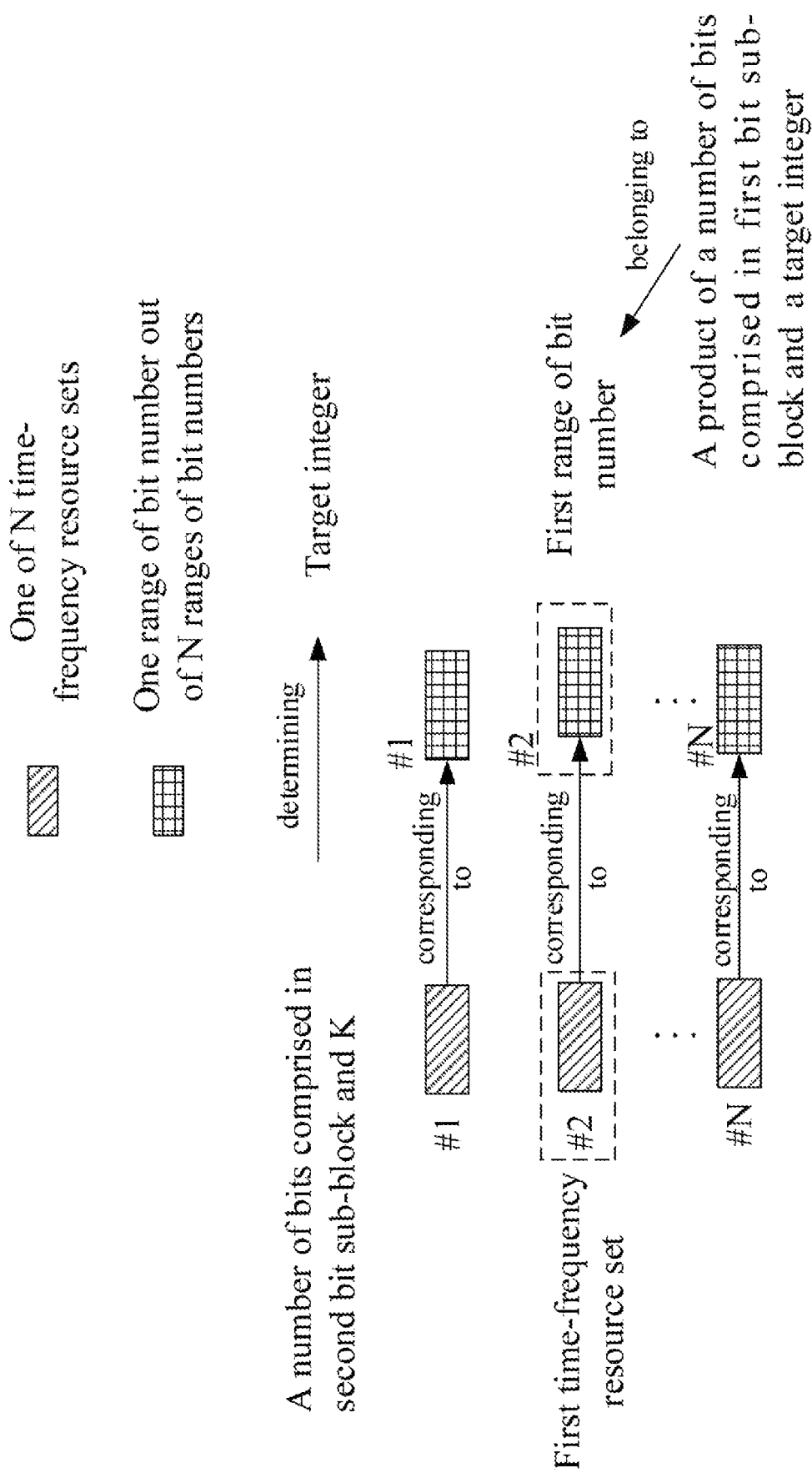
FIG. 18 illustrates a schematic diagram illustrating a number of bits comprised in a first bit block used for determining a first time-frequency resource set out of N time-frequency resource sets according to another embodiment of the present disclosure.

Embodiment 18 illustrates another schematic diagram illustrating a number of bits comprised in a first bit block used for determining a first time-frequency resource set out of N time-frequency resource sets, as shown in FIG. 18.

In Embodiment 18, the first bit block comprises a first bit sub-block and a second bit sub-block, the first bit sub-block is used for indicating whether the first radio signal is correctly received, the second bit sub-block is acquired based on a measurement on the third radio signal; a number of bits comprised in the first bit sub-block, a number of bits in the second bit sub-block and K are used for determining the first time-frequency resource set out of the N time-frequency resource sets, N is a positive integer greater than 1.

In one embodiment, the number of bits comprised in the second bit sub-block and K are used for determining a target integer, the target integer is a positive integer; a product of a number of bits comprised in the first bit sub-block and the target integer is used for determining the first time-frequency resource set out of the N time-frequency resource sets.

In one sub-embodiment of the above embodiment, the N time-frequency resource sets respectively correspond to N bit number ranges, the product of the number of bits comprised in the first bit sub-block and the target integer belongs to a first bit number range, the first bit number range is a bit number range of the N bit number ranges, the first time-frequency resource set is a time-frequency resource set of the N time-frequency resource sets corresponding to the first bit number range.

In one sub-embodiment of the above embodiment, a number of bits comprised in the second bit sub-block is equal to m, the m is a positive integer; the target integer is equal to the m.

In one sub-embodiment of the above embodiment, the second bit sub-block comprises S0 bits, S0 is not a positive integral multiple of K; a target bit block comprises the second bit sub-block and a third bit block, the third bit block comprises t bits, t is related to S0 and K; a number of bits comprised in the target bit block is n, n is a positive integer; the target integer is equal to n.

Embodiment 19

Figure 19:
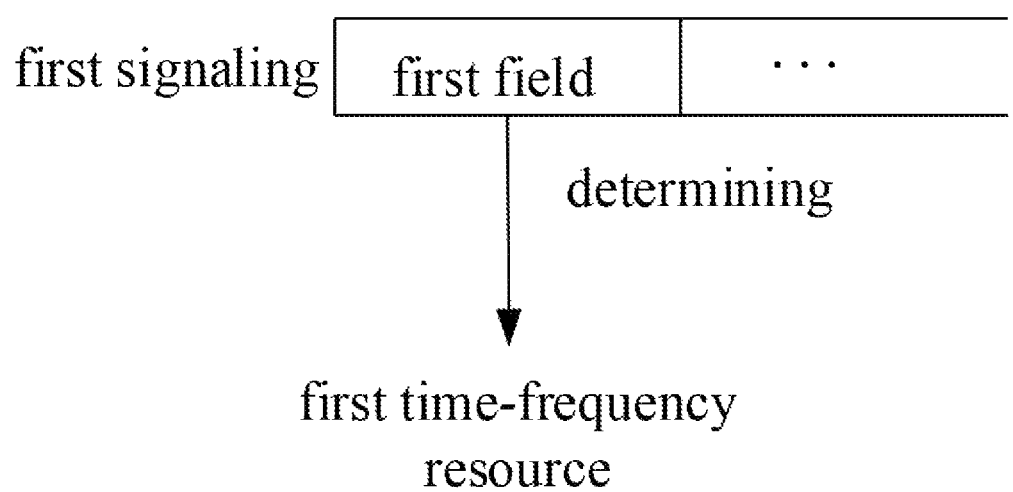
FIG. 19 illustrates a schematic diagram of a first signaling according to one embodiment of the present disclosure.

Embodiment 19 illustrates a schematic diagram of a first signaling, as shown in FIG. 19.

In Embodiment 19, the first signaling comprises a first field, the first field comprised in the first signaling is used for determining the first time-frequency resource in the present disclosure.

In one embodiment, the first field comprised in the first signaling comprises a positive integer number of bit(s).

In one embodiment, the first field comprised in the first signaling is used for determining the first time-frequency resource out of a first time-frequency resource set, the first time-frequency resource set comprises a positive integer number of time-frequency resource(s).

In one embodiment, the first field comprised in the first signaling indicates an index of the first time-frequency resource in a first time-frequency resource set, the first time-frequency resource set comprises a positive integer number of time-frequency resource(s).

In one embodiment, the first field comprised in the first signaling is a PUCCH resource indicator, the specific meaning of the PUCCH resource indicator can be found in 3GPP TS38.213, chapter 9.2.3.

Embodiment 20

Figure 20:
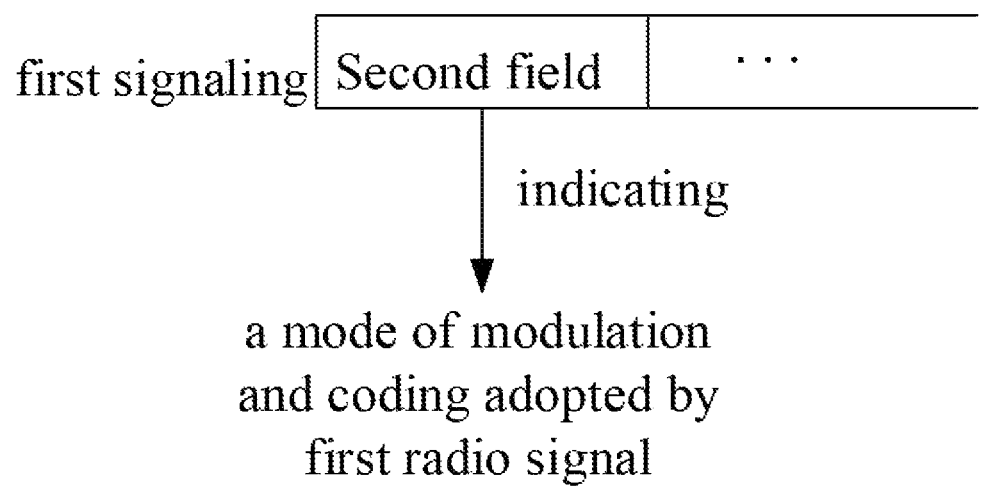
FIG. 20 illustrates a schematic diagram of a first signaling according to another embodiment of the present disclosure.

Embodiment 20 illustrates a schematic diagram of a first signaling, as shown in FIG. 20.

In Embodiment 20, the first signaling comprises a second field, the second field comprised in the first signaling is used for indicating a modulation and coding scheme adopted by the first radio signal in the present disclosure out of the target modulation and coding scheme set in the present disclosure.

In one embodiment, the target MCS set comprises a positive integer number of MCS(s).

In one embodiment, the second field comprised in the first signaling comprises a positive integer number of bit(s).

In one embodiment, the second field comprised in the first signaling indicates an index of the MCS adopted by the first radio signal in the MCS set.

In one embodiment, the second field comprised in the first signaling is a Modulation and coding scheme, the specific meaning of the Modulation and coding scheme can be found in 3GPP TS38.214, chapter 5.1.3.

Embodiment 21

Figure 21:
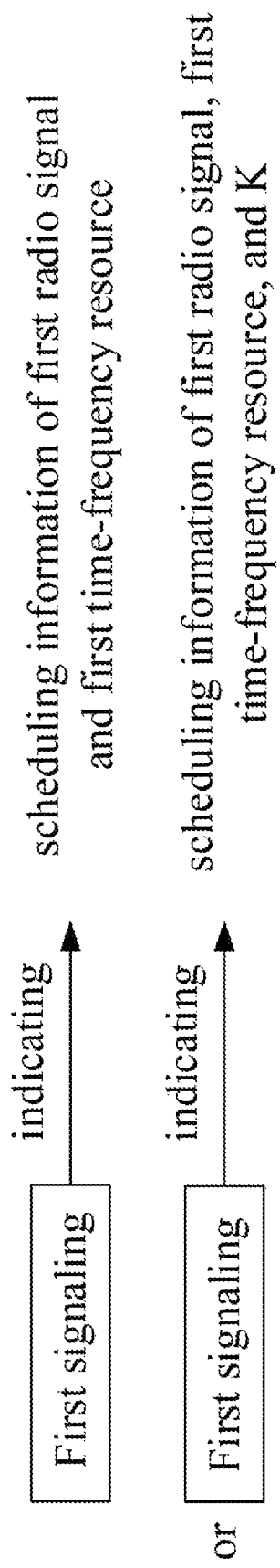
FIG. 21 illustrates a schematic diagram of a first signaling according to another embodiment of the present disclosure.

Embodiment 21 illustrates another schematic diagram of a first signaling, as shown in FIG. 21.

In Embodiment 21, the first signaling is used for indicating scheduling information of the first radio signal in the present disclosure and the first time-frequency resource in the present disclosure; or, the first signaling is used for indicating scheduling information, the first time-frequency resource and K in the present disclosure.

In one embodiment, the first signaling is used for indicating scheduling information of the first radio signal and the first time-frequency resource.

In one embodiment, the first signaling is used for indicating scheduling information, the first time-frequency resource and K.

In one embodiment, the scheduling information of the first radio signal comprises at least one of time domain resource occupied, frequency domain resource occupied, MCS, configuration information of DMRS, a HARQ process number, an RV, an NDI, a transmitting antenna port, corresponding multi-antenna relevant transmission, or corresponding multi-antenna reception.

In one sub-embodiment of the above embodiment, the MCS comprised by the scheduling information of the first radio signal is a modulation and coding scheme adopted by the first radio signal.

In one sub-embodiment of the above embodiment, the configuration information of the DMRS comprised by the scheduling information of the first radio signal comprises at least one of an RS sequence, a mapping mode, DMRS type, time domain resource occupied, frequency domain resource occupied, code domain resource occupied, cyclic shift or OCC.

Embodiment 22

Figure 22:
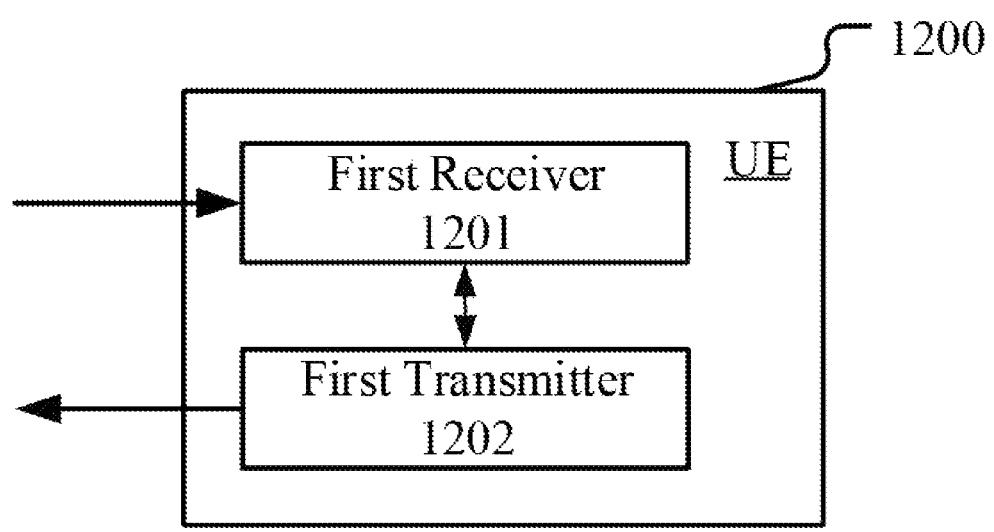
FIG. 22 illustrates a structure block diagram of a processing device in a UE according to one embodiment of the present disclosure.

Embodiment 22 illustrates a structure block diagram of a processing device in a UE, as shown in FIG. 22. In FIG. 22, a UE processing device 1200 comprises a first receiver 1201 and a first transmitter 1202.

In one embodiment, the first receiver 1201 comprises the receiver 456, the receiving processor 452 and the controller/processor 490 in Embodiment 4.

In one embodiment, the first receiver 1201 comprises at least the first two of the receiver 456, the receiving processor 452 and the controller/processor 490 in Embodiment 4.

In one embodiment, the first transmitter 1202 comprises the transmitter 456, the transmitting processor 455 and controller/processor 490 in Embodiment 4.

In one embodiment, the first transmitter 1202 comprises at least the first two of the transmitter 456, the transmitting processor 455 and controller/processor 490 in Embodiment 4.

A first receiver 1201 receives a first signaling (DL-grant DCI), the first signaling being used for determining a first time-frequency resource (PUCCH); and receives a second signaling (UL-grant DCI), the second signaling being used for determining a second time-frequency resource (PUSCH);

A first transmitter 1202 transmits a first bit block in the first time-frequency resource, or transmits a first bit block in the second time-frequency resource;

in Embodiment 22, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, if the first signaling carries the first identifier, then the first bit block is transmitted in the first time-frequency resource, or the first bit block is transmitted in the second time-frequency resource; if the first signaling carries the second identifier, then the first bit block is only transmitted in the second time-frequency resource between the first time-frequency resource and the second time-frequency resource.

In one embodiment, the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource.

In one embodiment, the first receiver 1201 further receives first information; the first receiver 1201 further receives a first radio signal; the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received.

In one embodiment, if the first bit block is transmitted in the second time-frequency resource, the first transmitter 1202 also transmits a second radio signal in the second time-frequency resource; if the first bit block is transmitted in the first time-frequency resource, the first transmitter 1202 drops transmitting a second radio signal in the second time-frequency resource, or, the first transmitter 1202 also transmits a first sub-signal in the second time-frequency resource, the first transmitter 1202 drops transmitting a second sub-signal in the second time-frequency resource; the second signaling is used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource.

In one embodiment, if the first bit block is transmitted in the second time-frequency resource, the first transmitter 1202 also transmits a second radio signal in the second time-frequency resource; if the first bit block is transmitted in the first time-frequency resource, the first transmitter 1202 also transmits a first sub-signal in the second time-frequency resource, the first transmitter 1202 drops transmitting a second sub-signal in the second time-frequency resource; the second signaling is further used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource.

In one embodiment, the first bit block is transmitted in the first time-frequency resource, the first time-frequency resource comprises K time-frequency resources, any two time-frequency resources of the K time-frequency resources are orthogonal, K is a positive integer greater than 1; the first bit block comprises a first bit sub-block and a second bit sub-block; the first bit sub-block is used for indicating whether the first radio signal is correctly received; the first bit sub-block is transmitted in each of the K time-frequency resources; the second bit sub-block is transmitted in each of the K time-frequency resources, or, at least one bit in the second bit sub-block is transmitted in only one time-frequency resource of the K time-frequency resources.

In one embodiment, the first receiver 1201 further receives second information; the first receiver 1201 further receives a third radio signal; the second information is used for determining configuration information of the third radio signal; the first bit block comprises the first bit sub-block and the second bit sub-block, the second bit sub-block is acquired based on a measurement on the third radio signal.

In one embodiment, the first receiver 1201 further receives third information; the third information is used for indicating N time-frequency resource sets, the first time-frequency resource is related to a first time-frequency resource set, the first time-frequency resource set is a time-frequency resource set of the N time-frequency resource sets; a number of bits comprised in the first bit block is used for determining the first time-frequency resource set out of the N time-frequency resource sets.

Embodiment 23

Figure 23:
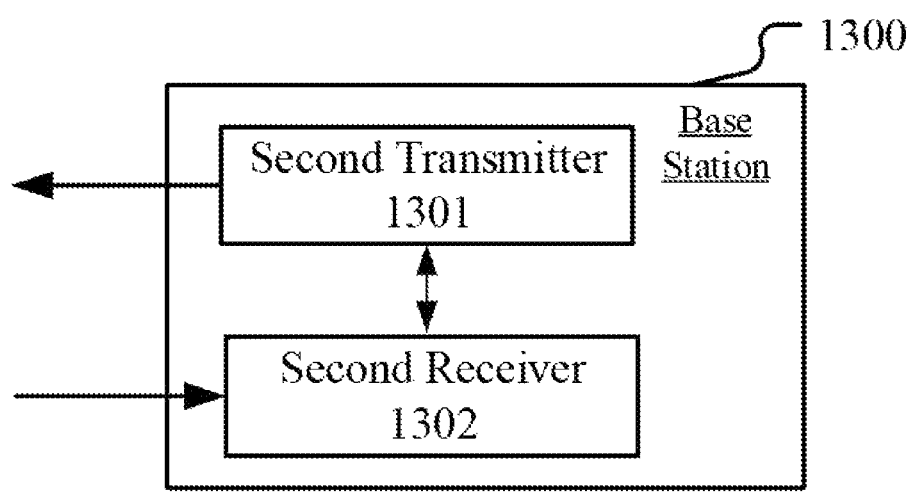
FIG. 23 illustrates a structure block diagram of a processing device in a base station according to one embodiment of the present disclosure.

Embodiment 23 illustrates a structure block diagram of a processing device in a base station, as shown in FIG. 23. In FIG. 23, a processing device 1300 in a base station comprises a second transmitter 1301 and a second receiver 1302.

In one embodiment, the second transmitter 1301 comprises the transmitter 416, the transmitting processor 415 and the controller/processor 440 in Embodiment 4.

In one embodiment, the second transmitter 1301 comprises at least the first two of the transmitter 416, the transmitting processor 415 and the controller/processor 440 in Embodiment 4.

In one embodiment, the second receiver 1302 comprises the receiver 416, the receiving processor 412 and the controller/processor 440 in Embodiment 4.

In one embodiment, the second receiver 1302 comprises at least the first two of the receiver 416, the receiving processor 412 and the controller/processor 440 in Embodiment 4.

The second transmitter 1301 transmits a first signaling, the first signaling being used for determining a first time-frequency resource; and transmits a second signaling, the second signaling being used for determining a second time-frequency resource;

the second receiver 1302 receives a first bit block in the first time-frequency resource, or receives a first bit block in the second time-frequency resource;

in Embodiment 23, time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

In one embodiment, if the first signaling carries the first identifier, the first bit block is received in the first time-frequency resource, or the first bit block is received in the second time-frequency resource; if the first signaling carries the second identifier, the first bit block is only received in the second time-frequency resource between the first time-frequency resource and the second time-frequency resource.

In one embodiment, the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource.

In one embodiment, the second transmitter 1301 further transmits first information; the second transmitter 1301 further transmits a first radio signal; the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received.

In one embodiment, if the first bit block is transmitted in the second time-frequency resource, the second receiver 1302 further receives a second radio signal in the second time-frequency resource; if the first bit block is transmitted in the first time-frequency resource, the second receiver 1302 drops receiving a second radio signal in the second time-frequency resource, or, the second receiver 1302 further receives a first sub-signal in the second time-frequency resource, the second receiver 1302 drops receiving a second sub-signal in the second time-frequency resource; the second signaling is also used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource.

In one embodiment, if the first bit block is transmitted in the second time-frequency resource, the second receiver 1302 further receives a second radio signal in the second time-frequency resource; if the first bit block is transmitted in the first time-frequency resource, the second receiver 1302 drops receiving a second radio signal in the second time-frequency resource; the second signaling is also used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource.

In one embodiment, if the first bit block is transmitted in the second time-frequency resource, the second receiver 1302 further receives a second radio signal in the second time-frequency resource; if the first bit block is transmitted in the first time-frequency resource, the second receiver 1302 further receives a first sub-signal in the second time-frequency resource, the second receiver 1302 drops receiving a second sub-signal in the second time-frequency resource; the second signaling is also used for indicating scheduling information of the second radio signal; the second radio signal comprises the first sub-signal and the second sub-signal, time domain resource occupied by the first sub-signal and time domain resource occupied by the first time-frequency resource are orthogonal, time domain resource occupied by the second sub-signal belongs to the time domain resource occupied by the first time-frequency resource.

In one embodiment, the first bit block is transmitted in the first time-frequency resource, the first time-frequency resource comprises K time-frequency resources, any two time-frequency resources of the K time-frequency resources are orthogonal, K is a positive integer greater than 1; the first bit block comprises a first bit sub-block and a second bit sub-block; the first bit sub-block is used for indicating whether the first radio signal is correctly received; the first bit sub-block is transmitted in each of the K time-frequency resources; the second bit sub-block is transmitted in each of the K time-frequency resources, or, at least one bit in the second bit sub-block is transmitted in only one time-frequency resource of the K time-frequency resources.

In one embodiment, the second transmitter 1301 further transmits second information; the second transmitter 1301 further transmits a third radio signal; the second information is used for determining configuration information of the third radio signal; the first bit block comprises the first bit sub-block and the second bit sub-block, the second bit sub-block is acquired based on a measurement on the third radio signal.

In one embodiment, the second transmitter 1301 further transmits third information; the third information is used for indicating N time-frequency resource sets, the first time-frequency resource is related to a first time-frequency resource set, the first time-frequency resource set is a time-frequency resource set of the N time-frequency resource sets; a number of bits comprised in the first bit block is used for determining the first time-frequency resource set out of the N time-frequency resource sets.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IoT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macrocellular base stations, micro-cellular base stations, home base stations, relay base station, gNB (NR node B), Transmit-Receive Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a first signaling, the first signaling being used to determine a first time-frequency resource;
   receiving a second signaling, the second signaling being used to determine a second time-frequency resource; and
   transmitting a first bit block in the first time-frequency resource, or, transmitting a first bit block in the second time-frequency resource;
   wherein time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

2. The method according to claim 1, wherein if the first signaling carries the first identifier, then the first bit block is transmitted in the first time-frequency resource or the first bit block is transmitted in the second time-frequency resource, if the first signaling carries the second identifier, then the first bit block is only transmitted in the second time-frequency resource between the first time-frequency resource and the second time-frequency resource; or, the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource; or, the first bit block is transmitted in the first time-frequency resource, the first time-frequency resource comprises K time-frequency resources, any two time-frequency resources of the K time-frequency resources are mutually orthogonal, K is a positive integer greater than 1, the first bit block comprises a first bit sub-block and a second bit sub-block, the first bit sub-block is used for indicating whether a first radio signal is correctly received, the first bit sub-block is transmitted in each time-frequency resource of the K time-frequency resources, the second bit sub-block is transmitted in each time-frequency resource of the K time-frequency resources or at least one bit in the second bit sub-block is transmitted in only one time-frequency resource of the K time-frequency resources.

3. The method according to claim 1, comprising:
receiving first information; and
receiving a first radio signal;
wherein the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received;
or, receiving third information;
wherein the third information is used for indicating N time-frequency resource sets, the first time-frequency resource is related to a first time-frequency resource set, the first time-frequency resource set is one of the N time-frequency resource sets; a number of bits comprised in the first bit block is used for determining the first time-frequency resource set out of the N time-frequency resource sets, N is a positive integer greater than 1.

4. The method according to claim 1, comprising:
if the first bit block is transmitted in the second time-frequency resource, then a second radio signal is also transmitted in the second time-frequency resource;
if the first bit block is transmitted in the first time-frequency resource, then a transmission of a second radio signal is dropped in the second time-frequency resource, or
a first sub-signal is also transmitted in the second time-frequency resource, and a transmission of a second sub-signal is dropped in the second time-frequency resource;
wherein the second signaling is further used for indicating scheduling information of the second radio signal; the second radio signal comprises the first sub-signal and the second sub-signal, time domain resource occupied by the first sub-signal and the time domain resource occupied by the first time-frequency resource are orthogonal, time domain resource occupied by the second sub-signal belongs to the time domain resource occupied by the first time-frequency resource.

5. A method in a base station for wireless communication, comprising:
transmitting a first signaling, the first signaling being used for determining a first time-frequency resource;
transmitting a second signaling, the second signaling being used for determining a second time-frequency resource; and
receiving a first bit block in the first time-frequency resource, or, receiving a first bit block in the second time-frequency resource;
wherein time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

6. The method according to claim 5, wherein if the first signaling carries the first identifier, then the first bit block is received in the first time-frequency resource or the first bit block is received in the second time-frequency resource, if the first signaling carries the second identifier, then the first bit block is only received in the second time-frequency resource between the first time-frequency resource and the second time-frequency resource; or, the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource; or, the first bit block is transmitted in the first time-frequency resource, the first time-frequency resource comprises K time-frequency resources, any two time-frequency resources of the K time-frequency resources are mutually orthogonal, K is a positive integer greater than 1, the first bit block comprises a first bit sub-block and a second bit sub-block, the first bit sub-block is used for indicating whether a first radio signal is correctly received, the first bit sub-block is transmitted in each time-frequency resource of the K time-frequency resources, the second bit sub-block is transmitted in each time-frequency resource of the K time-frequency resources or at least one bit in the second bit sub-block is transmitted in only one time-frequency resource of the K time-frequency resources.

7. The method according to claim 5, comprising:
transmitting first information; and
transmitting a first radio signal;
wherein the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received;

or, transmitting third information;

wherein the third information is used for indicating N time-frequency resource sets, the first time-frequency resource is related to a first time-frequency resource set, the first time-frequency resource set is one of the N time-frequency resource sets; a number of bits comprised in the first bit block is used for determining the first time-frequency resource set out of the N time-frequency resource sets, N is a positive integer greater than 1.

8. The method according to claim 5, comprising:

if the first bit block is transmitted in the second time-frequency resource, then a second radio signal is also received in the second time-frequency resource;

if the first bit block is transmitted in the first time-frequency resource, then a reception of a second radio signal is dropped in the second time-frequency resource, or a first sub-signal is also received in the second time-frequency resource, and a reception of a second sub-signal is dropped in the second time-frequency resource;

wherein the second signaling is further used for indicating scheduling information of the second radio signal; the second radio signal comprises the first sub-signal and the second sub-signal, time domain resource occupied by the first sub-signal and the time domain resource occupied by the first time-frequency resource are orthogonal, time domain resource occupied by the second sub-signal belongs to the time domain resource occupied by the first time-frequency resource.

9. A User Equipment (UE) used for wireless communication, comprising:

a first receiver, receiving a first signaling, the first signaling being used for determining a first time-frequency resource; receiving a second signaling, the second signaling being used for determining a second time-frequency resource; and a first transmitter, transmitting a first bit block in the first time-frequency resource, or transmitting a first bit block in the second time-frequency resource;

wherein time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

10. The UE according to claim 9, wherein if the first signaling carries the first identifier, then the first bit block is transmitted in the first time-frequency resource or the first bit block is transmitted in the second time-frequency resource, if the first signaling carries the second identifier, then the first bit block is only transmitted in the second time-frequency resource between the first time-frequency resource and the second time-frequency resource; or, the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource.

11. The UE according to claim 9, wherein the first receiver also receives first information; and receives a first radio signal; wherein the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received;

or, the first receiver also receives third information; wherein the third information is used for indicating N time-frequency resource sets, the first time-frequency resource is related to a first time-frequency resource set, the first time-frequency resource set is one of the N time-frequency resource sets; a number of bits comprised in the first bit block is used for determining the first time-frequency resource set out of the N time-frequency resource sets, N is a positive integer greater than 1.

12. The UE according to claim 9, wherein if the first bit block is transmitted in the second time-frequency resource, then the first transmitter also transmits a second radio signal in the second time-frequency resource; if the first bit block is transmitted in the first time-frequency resource, then a transmission of a second radio signal is dropped in the second time-frequency resource, or the first transmitter also transmits a first sub-signal in the second time-frequency resource, and drops transmitting a second sub-signal in the second time-frequency resource; herein, the second signaling is further used for indicating scheduling information of the second radio signal; the second radio signal comprises the first sub-signal and the second sub-signal, time domain resource occupied by the first sub-signal and the time domain resource occupied by the first time-frequency resource are orthogonal, time domain resource occupied by the second sub-signal belongs to the time domain resource occupied by the first time-frequency resource.

13. The UE according to claim 9, wherein the first bit block is transmitted in the first time-frequency resource, the first time-frequency resource comprises K time-frequency resources, any two time-frequency resources of the K time-frequency resources are mutually orthogonal, K is a positive integer greater than 1; the first bit block comprises a first bit sub-block and a second bit sub-block; the first bit sub-block is used for indicating whether a first radio signal is correctly received; the first bit sub-block is transmitted in each time-frequency resource of the K time-frequency resources; the second bit sub-block is transmitted in each time-frequency resource of the K time-frequency resources, or, at least one bit in the second bit sub-block is transmitted in only one time-frequency resource of the K time-frequency resources.

14. The UE according to claim 13, wherein a first receiver receives second information; and receives a third radio signal; wherein the second information is used for determining configuration information of the third radio signal; the first bit block comprises the first bit sub-block and the second bit sub-block, the second bit sub-block is acquired based on measurement on the third radio signal.

15. A base station used for wireless communication, comprising:
a second transmitter, transmitting a first signaling, the first signaling being used for determining a first time-frequency resource; and transmitting a second signaling, the second signaling being used for determining a second time-frequency resource; and
a second receiver, receiving a first bit block in the first time-frequency resource, or receiving a first bit block in the second time-frequency resource;
wherein time domain resource occupied by the first time-frequency resource and time domain resource occupied by the second time-frequency resource are non-orthogonal; the first signaling carries a first identifier or a second identifier; whether the first signaling carries the first identifier or the second identifier is used to determine whether the first bit block is transmitted in the first time-frequency resource or transmitted in the second time-frequency resource.

16. The base station according to claim 15, wherein if the first signaling carries the first identifier, then the first bit block is received in the first time-frequency resource or the first bit block is received in the second time-frequency resource, if the first signaling carries the second identifier, then the first bit block is only received in the second time-frequency resource between the first time-frequency resource and the second time-frequency resource; or, the first signaling carries the first identifier, a relative positional relation or a relative numerical relation between the time domain resource occupied by the first time-frequency resource and the time domain resource occupied by the second time-frequency resource is used for determining whether the first bit block is transmitted in the first time-frequency resource or is transmitted in the second time-frequency resource; or, the first signaling carries the first identifier, the second signaling carries the first identifier or the second identifier, whether the second signaling carries the first identifier or the second identifier is used for determining whether the first bit block is transmitted in the first time-frequency resource or is transmitted in the second time-frequency resource.

17. The base station according to claim 15, wherein the second transmitter also transmits first information; and transits a first radio signal; wherein the first information is used for indicating the first identifier, the first signaling carries the first identifier, the first signaling is also used for indicating a modulation and coding scheme adopted by the first radio signal out of a target modulation and coding scheme set, the target modulation and coding scheme set is an alternative modulation and coding scheme set of X alternative modulation and coding scheme sets, the first identifier is used for determining the target modulation and coding scheme set out of the X alternative modulation and coding scheme sets, X is a positive integer greater than 1; the first bit block is used for indicating whether the first radio signal is correctly received;
or, the second transmitter also transmits third information; wherein the third information is used for indicating N time-frequency resource sets, the first time-frequency resource is related to a first time-frequency resource set, the first time-frequency resource set is one of the N time-frequency resource sets; a number of bits comprised in the first bit block is used for determining the first time-frequency resource set out of the N time-frequency resource sets, N is a positive integer greater than 1.

18. The base station according to claim 15, wherein if the first bit block is transmitted in the second time-frequency resource, then the second receiver also receives a second radio signal in the second time-frequency resource; if the first bit block is transmitted in the first time-frequency resource, then a reception of a second radio signal is dropped in the second time-frequency resource, or the second receiver also receives a first sub-signal in the second time-frequency resource, and drops receiving a second sub-signal in the second time-frequency resource; herein, the second signaling is further used for indicating scheduling information of the second radio signal; the second radio signal comprises the first sub-signal and the second sub-signal, time domain resource occupied by the first sub-signal and the time domain resource occupied by the first time-frequency resource are orthogonal, time domain resource occupied by the second sub-signal belongs to the time domain resource occupied by the first time-frequency resource.

19. The base station according to claim 15, wherein the first bit block is transmitted in the first time-frequency resource, the first time-frequency resource comprises K time-frequency resources, any two time-frequency resources of the K time-frequency resources are mutually orthogonal, K is a positive integer greater than 1; the first bit block comprises a first bit sub-block and a second bit sub-block; the first bit sub-block is used for indicating whether a first radio signal is correctly received; the first bit sub-block is transmitted in each time-frequency resource of the K time-frequency resources; the second bit sub-block is transmitted in each time-frequency resource of the K time-frequency resources, or, at least one bit in the second bit sub-block is transmitted in only one time-frequency resource of the K time-frequency resources.

20. The base station according to claim 19, wherein the second transmitter also transmits second information; and transmits a third radio signal; wherein the second information is used for determining configuration information of the third radio signal; the first bit block comprises the first bit sub-block and the second bit sub-block, the second bit sub-block is acquired based on measurement on the third radio signal.

* * * * *